United States Patent
Odagiri et al.

(10) Patent No.: US 10,712,815 B2
(45) Date of Patent: Jul. 14, 2020

(54) INFORMATION PROCESSING DEVICE AND DISPLAY METHOD

(71) Applicant: FUJITSU LIMITED, Kawasaki-shi, Kanagawa (JP)

(72) Inventors: Junichi Odagiri, Kawasaki (JP); Osafumi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/043,943

(22) Filed: Jul. 24, 2018

(65) Prior Publication Data

US 2019/0033966 A1    Jan. 31, 2019

(30) Foreign Application Priority Data

Jul. 26, 2017  (JP) ................................ 2017-144745

(51) Int. Cl.

| G06F 3/01 | (2006.01) |
| G09G 5/377 | (2006.01) |
| G09G 5/08 | (2006.01) |
| G06F 3/0481 | (2013.01) |
| G06F 3/0489 | (2013.01) |

(52) U.S. Cl.
CPC ............ *G06F 3/013* (2013.01); *G06F 3/0481* (2013.01); *G06F 3/04892* (2013.01); *G09G 5/08* (2013.01); *G09G 5/377* (2013.01); *G09G 2340/12* (2013.01); *G09G 2354/00* (2013.01)

(58) Field of Classification Search
CPC .... G06F 3/013; G06F 3/0481; G06F 3/04892; G09G 5/08; G09G 5/377; G09G 2354/00

See application file for complete search history.

(56) References Cited

U.S. PATENT DOCUMENTS

| 2010/0241992 A1 | 9/2010 | Zhang |
| 2015/0301595 A1 | 10/2015 | Miki |
| 2015/0309565 A1 | 10/2015 | Beri et al. |
| 2016/0231810 A1 | 8/2016 | Imoto et al. |
| 2018/0164990 A1* | 6/2018 | Lin ..................... G11B 27/031 |

FOREIGN PATENT DOCUMENTS

| EP | 1906298 A2 | 4/2008 |
| JP | 2005-100366 | 4/2005 |
| JP | 2014-086063 | 5/2014 |
| JP | 2015-049721 | 3/2015 |

OTHER PUBLICATIONS

EESR—Extended European Search Report dated Dec. 11, 2018 for corresponding European Patent Application No. 18184413.5.

* cited by examiner

*Primary Examiner* — Alexander Eisen
*Assistant Examiner* — Kebede T Teshome
(74) *Attorney, Agent, or Firm* — Fujitsu Patent Center

(57) ABSTRACT

A procedure includes calculating a position of a line of sight of a user in a display screen of a display device, based on information on an eyeball portion of the user included in an input image, setting a processing target region which is a target region of processing corresponding to an input operation by a line of sight and an operation region which is adjacent to the processing target region and is for receiving the input operation by the line of sight, in the display screen, based on the position of the line of sight and information on a field of view of the user, and creating screen data in which image information within the processing target region is included in image information within the operation region and which is to be displayed on the display device.

8 Claims, 21 Drawing Sheets

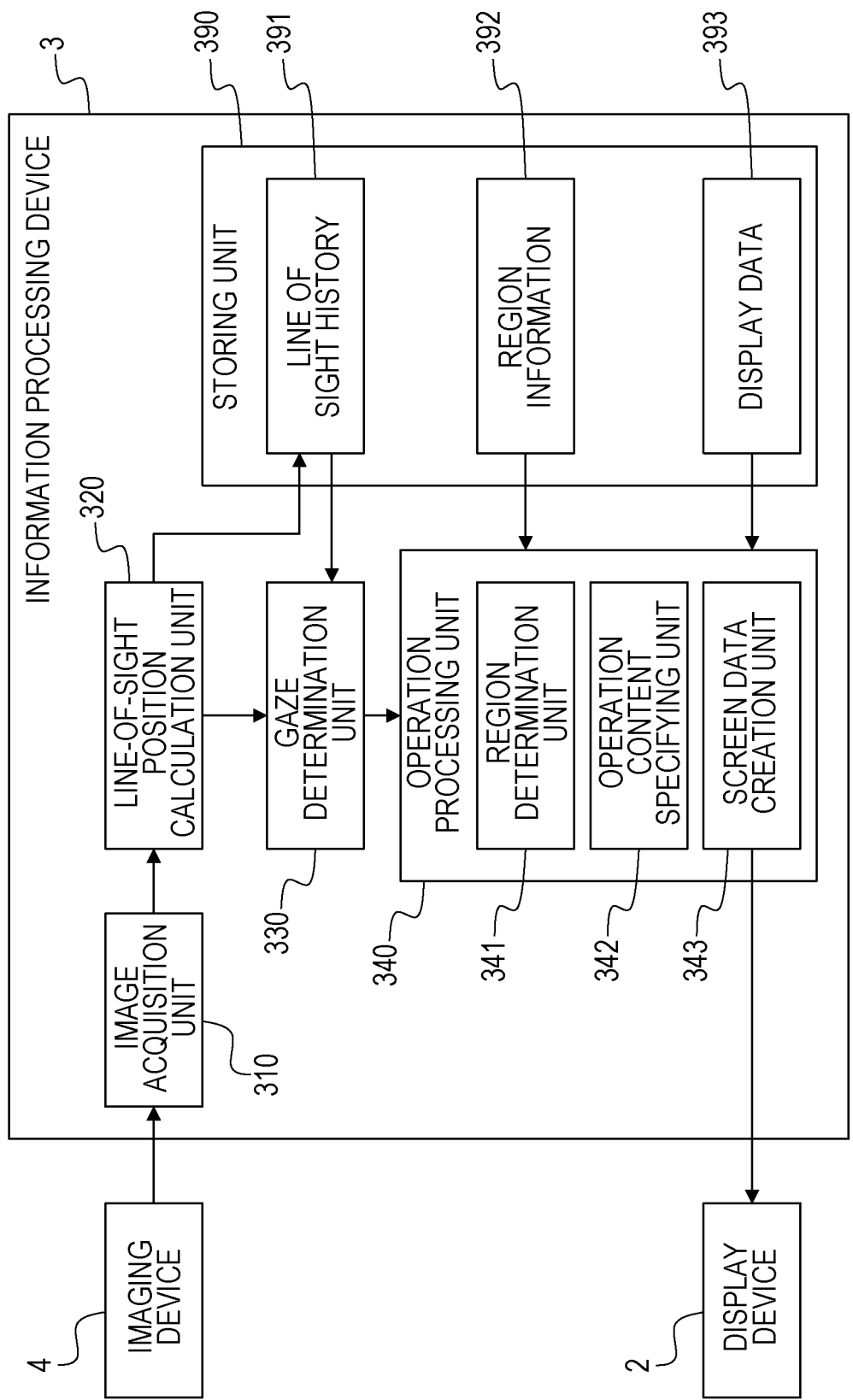

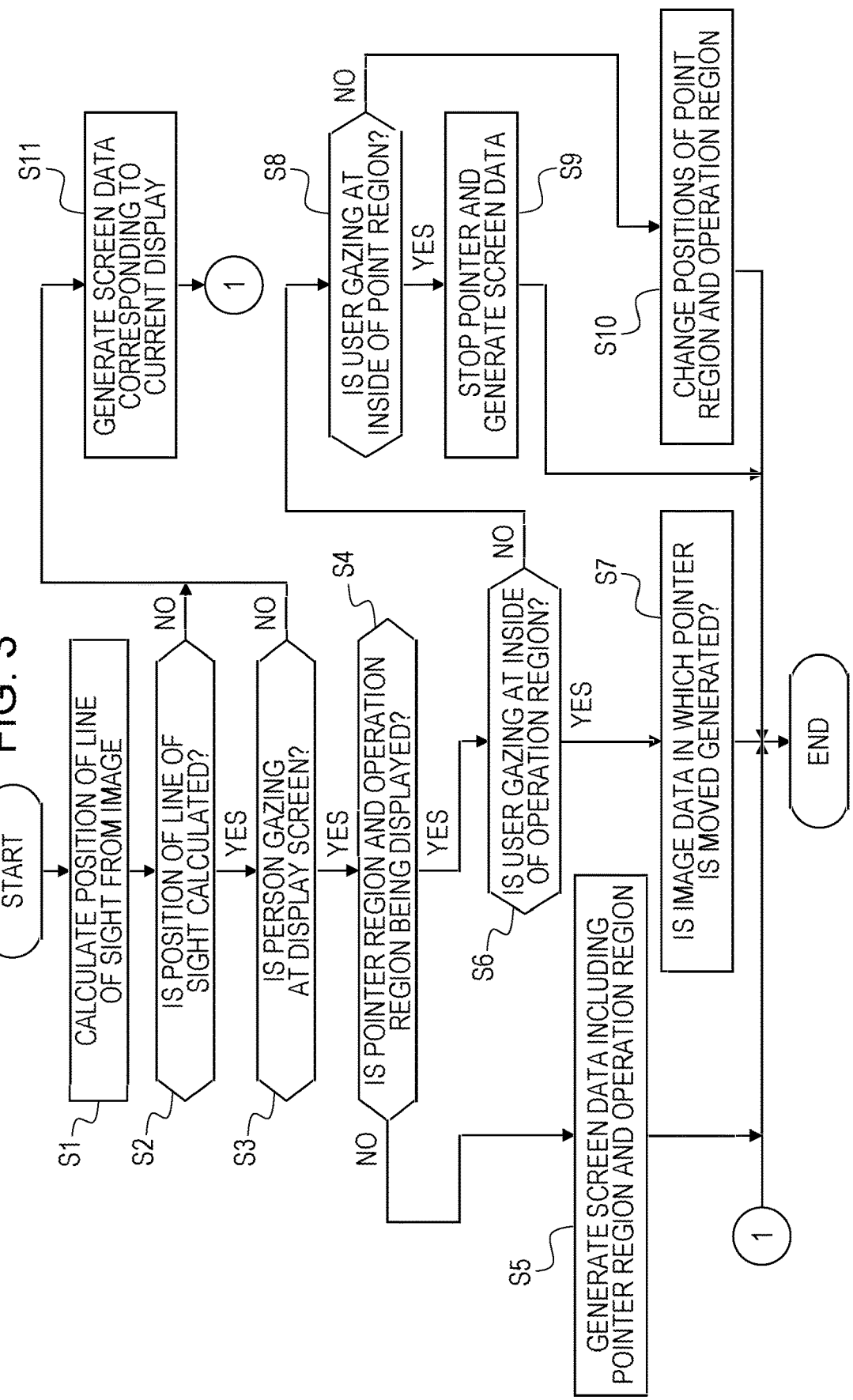

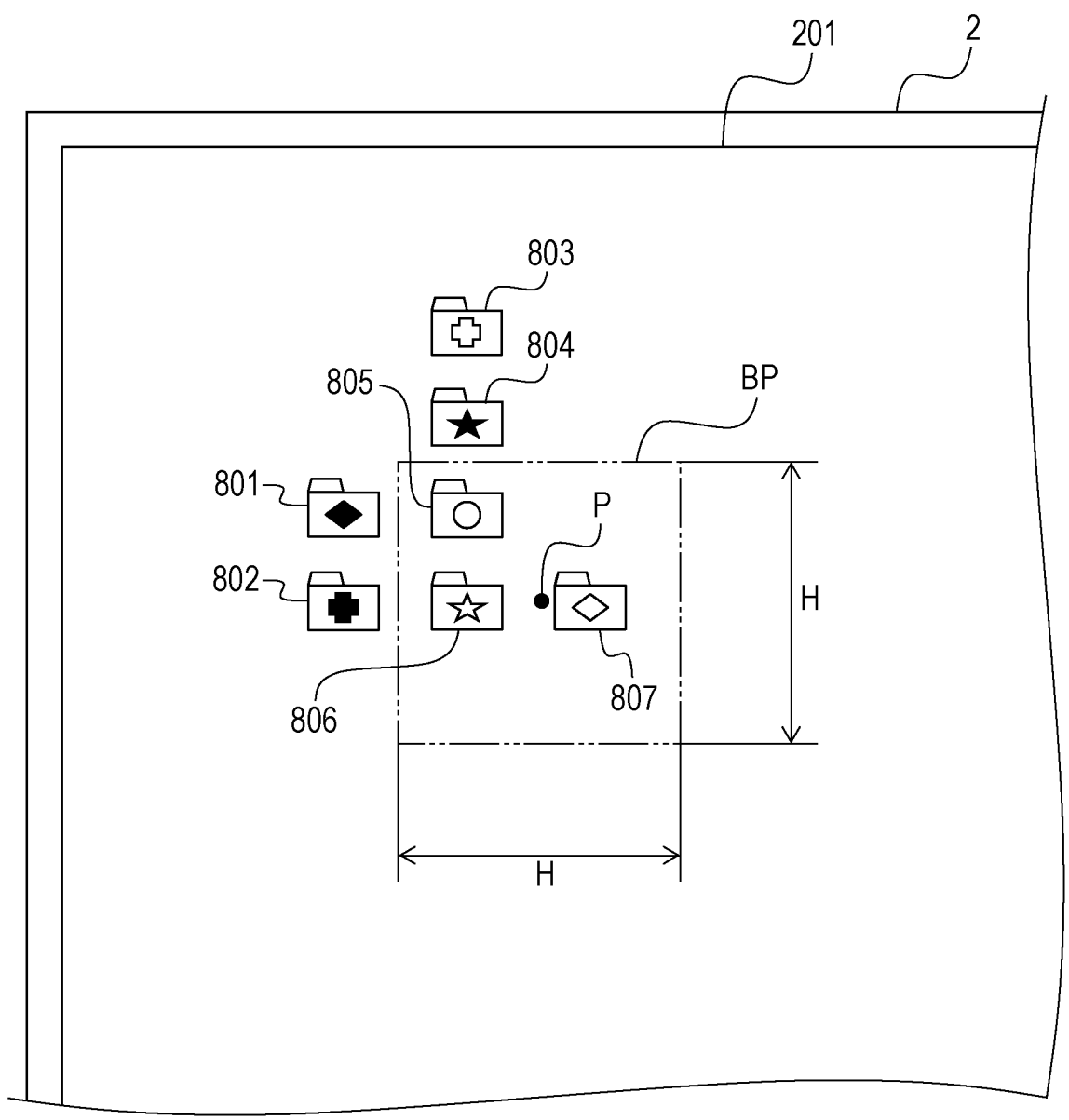

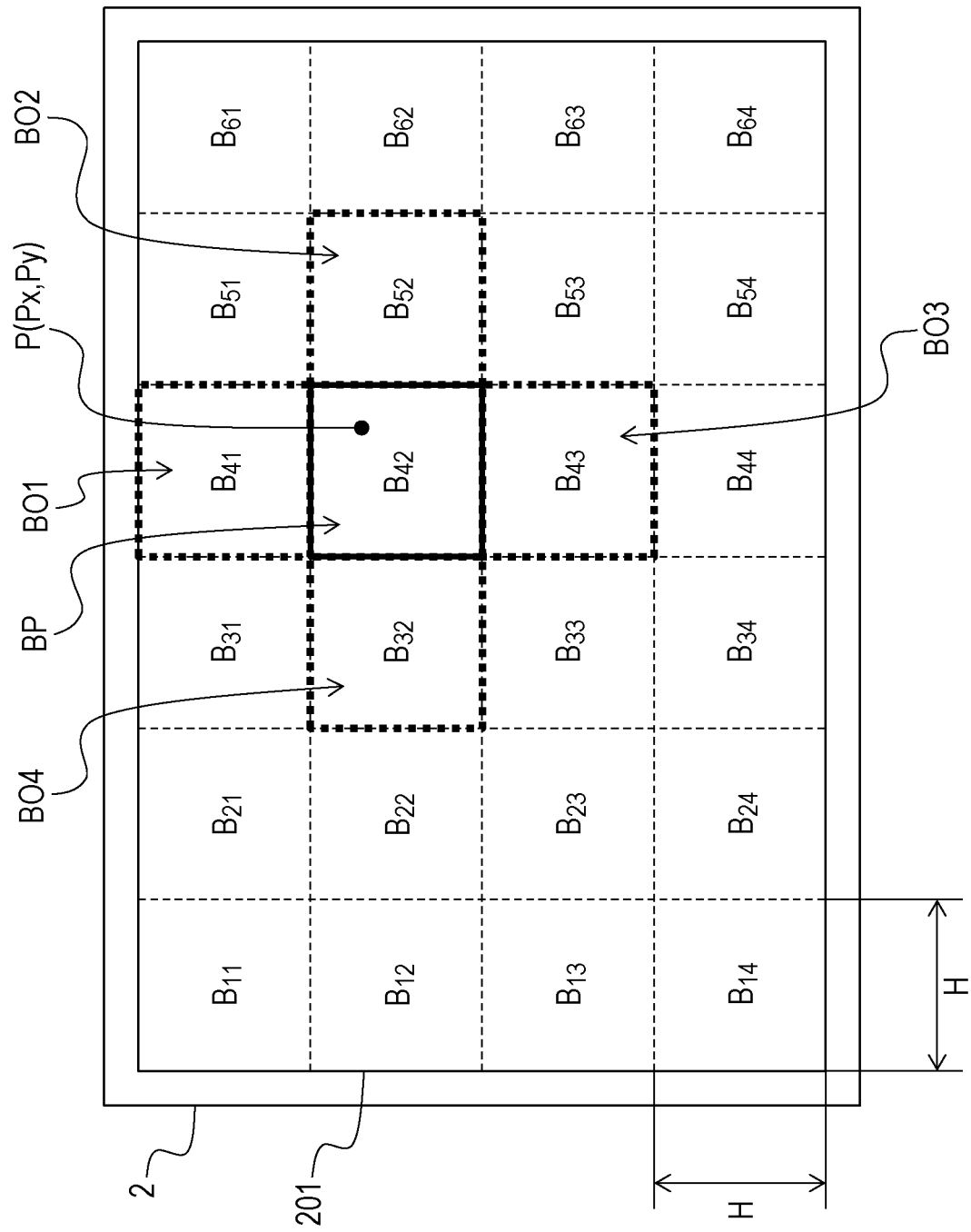

| REGION ID | OPERATION CONTENT WHEN USER IS GAZING AT OPERATION RANGE | 394 |
|---|---|---|
| BO1 | MOVE CURSOR UPWARD | |
| BO2 | MOVE CURSOR RIGHTWARD | |
| BO3 | MOVE CURSOR DOWNWARD | |
| BO4 | MOVE CURSOR LEFTWARD | |
| BO5 | MOVE CURSOR TO NEAREST OBJECT | |
| BO6 | SHIFT TO CHARACTER INPUT MODE | |
| BO7 | CANCEL SETTING OF REGION | |
| BO8 | CLICK TARGET | |

INFORMATION PROCESSING DEVICE AND DISPLAY METHOD

CROSS-REFERENCE TO RELATED APPLICATION

This application is based upon and claims the benefit of priority of the prior Japanese Patent Application No. 2017-144745, filed on Jul. 26, 2017, the entire contents of which are incorporated herein by reference.

FIELD

The embodiments discussed herein are related to an information processing device and a display method.

BACKGROUND

As one method of inputting operation information to various electronic apparatuses, there is a method using a line of sight detection technique. In the method of inputting operation information using the line of sight detection technique, a position being gazed at by a user is calculated based on the line of sight of the user (user) detected from an image and operation information associated with the position being gazed at by the user gazes is input to the electronic apparatus.

In the electronic apparatus capable of inputting operation information by the line of sight, for example, in a case where the user is gazing at one point on a display screen, it is possible to display an object such as a pointer at the position being gazed. In this type of electronic apparatus, for example, in a case where the user is gazing at one point in the display screen, an object within a predetermined range including the position being gazed can be enlarged and displayed. Furthermore, in this type of electronic device, for example, in a case where a user who is gazing at the one point in the display screen moves his/her line of sight, the pointer displayed at the position that the user was gazing at can be moved in a direction corresponding to a movement direction of the line of sight (see, for example, Japanese Laid-open Patent Publication No. 2005-100366).

SUMMARY

According to an aspect of the invention, a computer-readable non-transitory recording medium storing a program that causes a computer to execute a procedure, the procedure includes calculating a position of a line of sight of a user in a display screen of a display device, based on information on an eyeball portion of the user included in an input image, setting a processing target region which is a target region of processing corresponding to an input operation by a line of sight and an operation region which is adjacent to the processing target region and is for receiving the input operation by the line of sight, in the display screen, based on the position of the line of sight and information on a field of view of the user, and creating screen data in which image information within the processing target region is included in image information within the operation region and which is to be displayed on the display device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a functional configuration of an information processing device according to a first embodiment;

FIG. 3 is a flowchart illustrating processing performed by the information processing device according to the first embodiment;

FIG. 4 is a diagram illustrating an example of a screen displayed when a user is not gazing at a display screen;

FIG. 11 is a for explaining still another example of a method of setting a point region and the operation region;

DESCRIPTION OF EMBODIMENTS

In a case where a user is gazing at one point on a display screen or the like, even in a situation where the user himself/herself recognizes that he/she is continuously viewing one point, the position of the line of sight finely moves due to fixation fine movement (fine eye shake) and a detection error or the like occurring in image processing. For that reason, when it is determined whether or not the user is gazing at the display screen, it is often determined based on whether or not a range of movement of the position of the line of sight within a predetermined period is within a predetermined range. When it is determined that gazing is being done in a case where the range of movement of the position of the line of sight is within the predetermined range, when the user moves the line of sight for the purpose of moving an operation target such as the pointer displayed at the position being gazed by the user, the line of sight is moved to the outside of the predetermined range described above.

Furthermore, in order to confirm whether or not the operation target is moved to a desired position, the user who moved the line of sight repeatedly moves the line of sight between a display position of the operation target and a position where the operation target is movable. Such repetition of movement of the line of sight becomes a burden to the user and operability of the input operation by the line of sight is reduced.

In the following, the embodiments of a technique capable of improving operability of an input operation by a line of sight will be described in detail with reference to the drawings.

Figure 1:
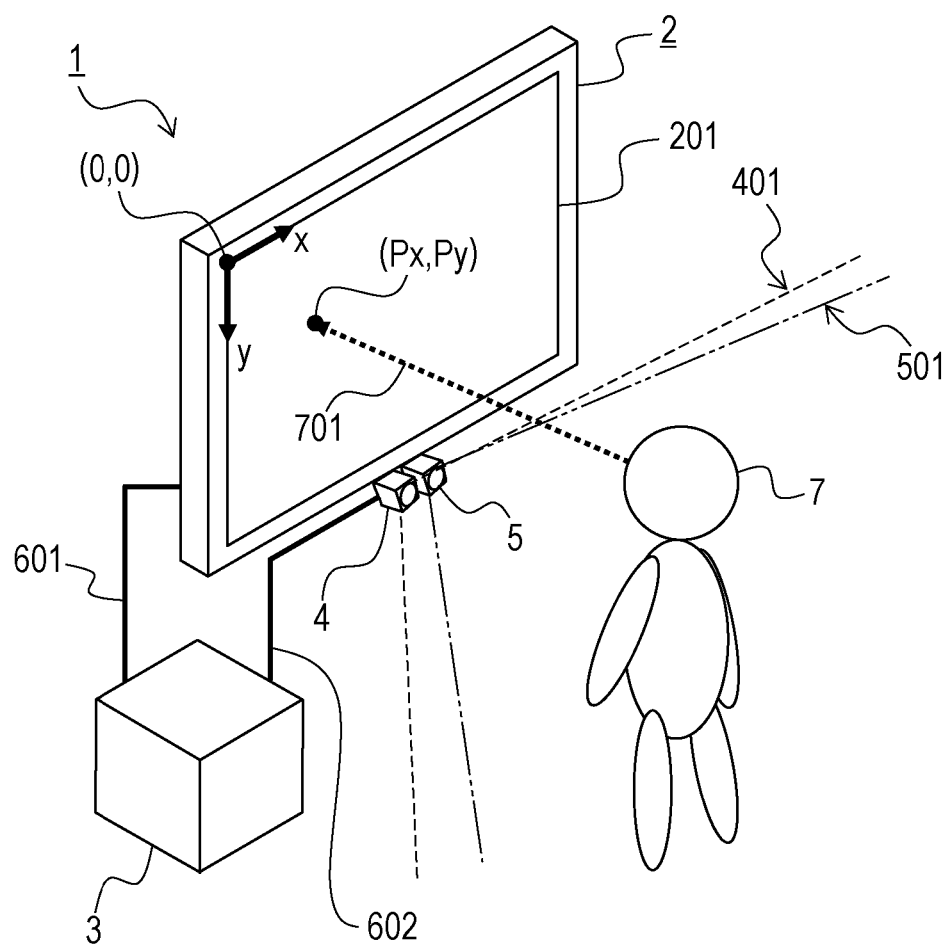
FIG. 1 is a diagram illustrating a system configuration example of a display system corresponding to an input operation by a line of sight.

FIG. 1 is a diagram illustrating a system configuration example of a display system corresponding to an input operation by a line of sight.

As illustrated in FIG. 1, a display system 1 corresponding to an input operation by a line of sight (hereinafter referred to as "line of sight input") includes a display device 2, an information processing device 3, an imaging device 4, and an infrared light source 5.

The display device 2 displays various information to be provided to a user (user) 7. Screen data of various information to be displayed on a display screen 201 of the display device 2 is created by the information processing device 3.

The information processing device 3 creates screen data of various information to be displayed on the display screen 201 of the display device 2 and outputs the created screen data to the display device 2. The information processing device 3 and the display device 2 are connected by a cable 601. The screen data created by the information processing device 3 is transferred to the display device 2 via the cable 6.

In a case where the information processing device 3 acquires an image captured by the imaging device 4 installed in the vicinity of the display device 2 and detects a line of sight 701 of the user (user) 7 from the acquired image, the information processing device 3 calculates a position (Px, Py) of the line of sight on the display screen 201 of the display device 2. Here, for example, the position (Px, Py) of the line of sight on the display screen 201 is represented by using the upper left corner as the origin (0, 0) on the display screen 201 and is represented by the distance Px in the horizontal direction (x-direction) from the origin and the distance Py in the vertical direction (y-direction) from the origin. The imaging device 4 and the information processing device 3 are connected by a cable 602. The image captured by the imaging device 4 is transferred to the information processing device 3 via the cable 602.

In a case where the information processing device 3 calculates the position of the line of sight of the user 7 by the pupil-corneal reflection method, an image used for calculating the position of the line of sight is, for example, an image captured by the imaging device 4 in a state in which infrared rays emitted from the infrared light source 5 is projected in an imaging range 401 of the imaging device 4. The infrared light source 5 is installed in the vicinity of the imaging device 4 in such a way that infrared rays are projected in a projection range 501 within the imaging range 401 of the imaging device 4. In this case, in a state in which the head of the user 7 exists within the imaging range 401 of the imaging device 4 and the user 7 is observing the display screen 201 of the display device 2, in the image captured by the imaging device 4, the corneal reflection is reflected in the eyeball portion of the user 7.

Furthermore, when the user 7 gazes at one point in the display screen 201, the information processing device 3 in the display system 1 sets a point region including the point being gazed and an operation region outside the point region and adjacent to the point region in the display screen 201. The point region is an example of a processing target region to be processed by processing corresponding to the line of sight input when the line of sight is input. On the other hand, the operation region is a region for receiving the line of sight input with respect to an operation target displayed in the point region. For example, in the point region, a pointer used for selecting an object such as an icon is displayed. The pointer displayed in the point region moves within the display screen 201 as the user 7 gazes at the operation region. That is, in a case where the user 7 gazes at a point within the operation region, the information processing device 3 performs processing on the pointer displayed within the point region which is inside the operation region.

When the point region and the operation region are set, the information processing device 3 generates image data including, for example, a frame line indicating the range of the point region and the operation region and a pointer in the point region, and outputs the image data to the display device 2. When the line of sight of the user 7 moves from within the point region to within the operation region in a state where the pointer is displayed in the point region on the display screen 201 of the display device 2, the information processing device 3 moves the pointer in the point region based on a positional relationship between the operation region including the position of the line of sight of the user 7 and the point region. In this case, the information processing device 3 generates screen data in which image information corresponding to image information to be displayed in the point region is displayed within at least the operation region including the position of the line of sight of the user 7. For example, the information processing device 3 creates screen data in which the image information of the operation region being gazed by the user 7 is replaced with the same image information as the image information in the point region.

First Embodiment

FIG. 2 is a diagram illustrating a functional configuration of an information processing device according to a first embodiment. As illustrated in FIG. 2, the information processing device 3 of the first embodiment includes an image acquisition unit 310, a line-of-sight position calculation unit 320, a gaze determination unit 330, and an operation processing unit 340. The information processing device 3 according to the first embodiment includes a storing unit 390 that stores various pieces of information including a line of sight history 391, region information 392, and display data 393.

The image acquisition unit 310 acquires an image captured by the imaging device 4. The imaging device 4 is installed, in the display device 2 connected to the information processing device 3 or in the vicinity of the display device 2, at a position and orientation where an image including the eyeball of the user 7 who observes the display screen 201 of the display device 2 can be captured.

The line-of-sight position calculation unit 320 detects the line of sight of the user 7 who observes the display screen 201 of the display device 2 based on the image acquired from the imaging device 4 and calculates the position of the line of sight on the display screen 201 of the display device 2. The line-of-sight position calculation unit 220 detects the line of sight of the user 7 and calculates the position of the line of sight, for example, according to a known calculation method in the pupil-corneal reflection method. The line-of-sight position calculation unit 220 stores a detection result including the calculated line of sight position and the line of sight detection time in the line of sight history 391.

The gaze determination unit 330 determines whether or not the user 7 who is observing the display screen 201 of the display device 2 gazes one point on the display screen 201 based on the temporal change in the position of the line of sight within the display screen 201 of the display device 2. The gaze determination unit 330 refers to the line of sight history 391 and determines that the user 7 gazes at one point on the display screen 201, in a case where the distribution of the positions of the line of sight within a predetermined period (for example, 3 seconds) is within a predetermined range.

The operation processing unit 340 specifies an operation content of the input operation by the line of sight based on the position and temporal change of the line of sight and generates screen data of a display image to be displayed on the display device 2. In a case where the line of sight of the user 7 is not detected from the image, the operation processing unit 340 generates screen data not including information indicating the point region and the operation region, and outputs the screen data to the display device 2. In a case where the user 7 is gazing at the inside of the display screen 201 of the display device 2, the operation processing unit 340 sets the point region and the operation region, generates screen data including information such as the point region and the frame line indicating the operation region, and outputs the screen data to the display device 2. As described above, the point region is an example of a processing target region which becomes a target of processing corresponding to the input operation when an input operation by line of sight is received. In the point region, for example, a pointer for selecting an object such as an icon or a button is displayed. On the other hand, the operation region is a region for receiving an input operation by a line of sight with respect to an operation target (for example, a pointer) displayed within the point region. Furthermore, in a case where the user 7 is gazing at the operation region, the operation processing unit 340 performs processing corresponding to the operation region being gazed by the user 7, generates screen data after the processing, displays the screen data on the display device 2. For example, in a case where the user 7 moves the position of the line of sight from within the pointer region to within the operation region and gazes at the inside the operation region, the operation processing unit 340 generates screen data in which the pointer displayed within the point region is moved in a direction according to the positional relationship between the pointer region and the operation region. In this case, the operation processing unit 340 generates screen data in which image information within the operation region being gazed by the user 7 becomes image information including image information within the point region in the screen data to be generated.

The operation processing unit 340 includes a region determination unit 341, an operation content specifying unit 342, and a screen data creation unit 343. In a case where the user 7 is gazing at one point in the display screen 201, the region determination unit 341 sets the point region and the operation region based on the position being gazed and region information 392. The region information 392 includes, for example, information indicating a range (dimension) of the point region and of the operation region. The operation content specifying unit 342 specifies the content of the input operation by the line of sight based on the position being gazed by the user 7 in a state where the point region and the operation region are set. The screen data creation unit 343 creates screen data to be displayed on the display device 2 based on the processing result of the region determination unit 341 and the operation content specifying unit 342. The screen data creation unit 343 creates screen data based on image information of various objects, for example, icons, buttons, pointers, and the like included in display data 393. In a case where the point region and the operation region are set, the screen data creation unit 343 creates screen data to which information such as a frame line indicating the operation region and the point region is added. Furthermore, in a case where the user 7 is gazing at the operation region, the screen data creation unit 343 creates screen data in which image information in the operation region, which the user is gazing at becomes image information including image information of the pointer region after being subjected to processing corresponding to the operation region. The screen data creation unit 343 outputs (transmits) the created screen data to the display device 2.

The information processing device 1 of the first embodiment generates predetermined screen data, outputs the screen data to the display device 2, starts processing of acquiring an image from the imaging device 4, and then, repeats processing according to the flowchart of FIG. 3 at predetermined time intervals, for example.

FIG. 3 is a flowchart illustrating processing performed by the information processing device according to the first embodiment.

First, the information processing device 3 of the first embodiment selects an image which becomes a processing target and performs processing of calculating the position of the line of sight from the image (Operation S1). Processing in Operation S1 is performed by the line-of-sight position calculation unit 320. The line-of-sight position calculation unit 320 first performs processing of detecting a line of sight of a person from an image according to a known line of sight detection method. In the case of detecting the line of sight by the pupil-corneal reflection method, the line-of-sight position calculation unit 320 performs processing of detecting the pupil of the human eye and infrared light (corneal reflection) reflected from the cornea from the image. In a case where the pupil and the cornea reflection are not detected from the image, the line-of-sight position calculation unit 320 recognizes that the position of the line of sight is not calculated from the image to be processed, and ends processing of the Operation S1. On the other hand, in a case where the pupil and corneal reflection are detected from the image, the line-of-sight position calculation unit 320 calculates a position of the line of sight within the display screen 201 of the display device 2 based on the position of the pupil and the position of the corneal reflection in the image. The line-of-sight position calculation unit 320 calculates the position of the line of sight according to a known calculation method. In a case where the position of the line of sight is calculated, the line-of-sight position calculation unit 320 stores the detection result including the calculated line of sight position and information indicating the imaging time of the processing target image in the line of sight history 391.

When processing in Operation S1 is ended, the information processing device 3 next determines whether or not the position of the line of sight can be calculated (Operation S2). The determination in Operation S2 is performed by the line-of-sight position calculation unit 320, for example. In a case where it is determined that the position of the line of sight is not calculated (NO in Operation S2), the line-of-sight position calculation unit 320 generates screen data corresponding to the current display on the display device 2 and outputs the screen data to the display device 2 (Operation S11). Processing in Operation S11 is performed by the screen data creation unit 343 of the operation processing unit 340. In the case of performing processing in Operation S11, the screen data creation unit 343 creates the same screen data as the screen data currently displayed on the display device 2 and outputs (transmits) the screen data to the display device 2. When processing in Operation S11 is performed, the information processing device 3 ends processing on the selected image.

In a case where it is determined that the position of the line of sight can be calculated (YES in Operation S2), the information processing device 3 next determines, based on the history of the line of sight position, whether or not a person appearing in the image is gazing at one point within the display screen 201 of the display device 2 (Operation S3). The determination in Operation S3 is performed by the gaze determination unit 330. The gaze determination unit 330 reads information on the position of the line of sight for a predetermined period (for example, the most recent 3 seconds) from the line of sight history 391, and determines whether or not the distribution (movement range) of the positions of the line of sight within the period is within a predetermined range. In a case where it is determined that the distribution of the positions of the line of sight within the predetermined period is within the predetermined range, the gaze determination unit 330 determines that the user is gazing at the inside of the display screen 201. For example, the predetermined range, which becomes a criterion for determining whether or not the user is gazing at the display screen, is set based on the central field of view or effective field of view of a person and the distance from the display screen 201 to the eyeball of the user 7. Here, the central field of view or the effective field of view of a person may be the central field of view or the effective field of view of the person who is the user (user) 7, or may be an average value obtained by statistical processing or the like. In a case where it is determined that the person appearing in the image is not gazing at the inside of the display screen 201 (NO in Operation S3), the information processing device 3 creates screen data corresponding to the current display on the display device 2 and transmits the screen data to the display device 2 (Operation S11), and ends processing on the selected image.

In a case where it is determined that the person appearing in the image is gazing at the inside of the display screen 201 (YES in Operation S3), the information processing device 3 next determines whether or not the point region and the operation region are being displayed on the display screen 201 (Operation S4). The determination in Operation S4 is performed, for example, by the region determination unit 341 of the operation processing unit 340. In a case where it is determined that the pointer region and the operation region are not yet displayed (NO in Operation S4), the information processing device 3 generates screen data including information indicating the pointer region and the operation region and outputs the screen data to the display device 2 (Operation S5). Processing in Operation S5 is performed by the region determination unit 341 and the screen data creation unit 343 of the operation processing unit 340. In the case of performing processing in Operation S5, the region determination unit 341 determines the position of the point region and the operation region within the display screen, based on the position of the line of sight within the display screen 201 and information indicating the range of the point region and the operation region included in the region information 392. In the case of performing processing in Operation S5, the screen data creation unit 343 creates screen data in which information indicating the point region and the operation region is superimposed (added) onto the screen data currently displayed on the display device 2, and transmits the screen data to the display device 2. For example, in processing in Operation S5, the screen data creation unit 343 creates screen data in which a frame line indicating the range of the point region and the range of the operation region and a pointer in the point region are superimposed onto the screen data currently displayed on the display device 2. For example, the screen data creation unit 343 may create screen data in which image information in the operation region is image information including image information in the point region. Here, image information is information indicating an object, a background, and the like displayed in a predetermined region (operation region or point region) of the display screen 201. The image information in the operation region is not limited to the same image information as the image information in the point region, but may be information in which image information within the operation region is combined with image information within the point region, in the screen data currently displayed on the display device 2. When processing in Operation S5 is performed, the information processing device 3 ends processing on the selected image.

In a case where it is determined that the point region and the operation region are being displayed on the display screen 201 (YES in Operation S4), the information processing device 3 next determines whether or not the user is gazing at the inside of the operation region (Operation S6). The determination in Operation S6 is performed by the operation content specifying unit 342 of the operation processing unit 340, for example. In a case where it is determined that the user is gazing at the operation region (YES in Operation S6), the information processing device 3 generates image data in which the pointer is moved and image information in the point region is included within image information in the operation region, and outputs the image data to the display device 2 (Operation S7).

Processing in Operation S7 is performed by the operation content specifying unit 342 of the operation processing unit 340 and the screen data creation unit 343. In the case of performing processing in Operation S7, the operation content specifying unit 342 specifies the direction of moving the pointer based on the positional relationship between the operation region including the position being gazed by the user 7 and the point region. For example, in a case where the user 7 is gazing at the operation region positioned on the right side of the point region, the operation content specifying unit 342 specifies the moving direction of the pointer to the right. In the case of performing processing in Operation S7, the screen data creation unit 343 creates screen data after performing processing corresponding to the specified operation content. For example, in processing in Operation S7, the screen data creation unit 343 creates screen data in which the position of the pointer in the screen data currently displayed on the display device 2 is moved. For example, in a case where the position of the pointer after the movement is within a range in which another object such as an icon can be selected, the screen data creation unit 343 creates screen data indicating that a corresponding object is selected. Furthermore, in processing in Operation S7, the screen data creation unit 343 creates screen data in which image information in the operation region including the position being gazed by the user 7 is replaced with, for example, image information in the point region. That is, by performing processing in Operation S7 in the information processing device 3, image information in a point region (processing target region) different from the operation region is displayed, in the operation region including the position being gazed by the user 7 on the display screen 201 of the display device 2. When processing in Operation S7 is performed, the information processing device 3 ends processing on the selected image.

In contrast, in a case where it is determined that the user is not gazing at the inside of the operation region (NO in Operation S6), the information processing device 3 next determines whether or not the user is gazing at the inside of the point region (Operation S8). The determination in Operation S8 is performed by, for example, the operation content specifying unit 342 of the operation processing unit 340. In a case where it is determined that the user is gazing at the inside of the pointer region (YES in Operation S8), the information processing device 3 generates image data in which the pointer is stopped and the image information corresponding to the image information in the point region is included in the operation region and outputs the image data to the display device 2 (Operation S9).

Processing in Operation S9 is performed by the operation content specifying unit 342 and the screen data creation unit 343 of the operation processing unit 340. In the case of performing processing in Operation S9, the operation content specifying unit 342 specifies the position of the pointer in screen data to be created as the position of the pointer in the screen data currently displayed on the display device 2. For that reason, in the case of performing processing in Operation S9, the screen data creation unit 343 creates the same screen data as the screen data currently displayed on the display device 2. In processing in Operation S9, the screen data creation unit 343 creates screen data including information indicating the pointer region and the operation region and the pointer. When processing in Operation S9 is performed, the information processing device 3 ends processing on the selected image.

On the other hand, in a case where it is determined that the user is not gazing at the inside of the point region (NO in Operation S8), in processing of FIG. 3, the position being gazed by the user 7 is a position different from the inside of the point region and inside of the operation region within the display screen 201. In this case, the information processing device 3 creates screen data in which the positions of the pointer region and the operation region are changed based on the current position being gazed by the user 7 (Operation S10). Processing in Operation S10 is performed by the region determination unit 341 and the screen data creation unit 343 of the operation processing unit 340. In Operation S10, the region determination unit 341 and the screen data creation unit 343 respectively perform the same processing as Operation S5 and create screen data in which the positions of the pointer region and the operation region are changed. When processing in Operation S10 is performed, the information processing device 3 ends processing with respect to the selected image. In processing in Operation S10, instead of changing the positions of the point region and the operation region, setting of the point region and the operation region may be canceled.

As such, in the information processing device 3 according to the first embodiment, in a case where it is determined from the image that a person is gazing at the display screen, the information processing device 3 creates screen data including information indicating the point region including the point being gazed and the operation region adjacent to the point region, and causes the display device 2 to display the screen data. Furthermore, the information processing device 3 according to the first embodiment, displays screen data including information indicating the point region and the operation region on the display device 2, and creates screen data in which image information in the point region is included in the operation region in a case where the user 7 is gazing at the inside of the operation region.

FIG. 4 is a diagram illustrating an example of a screen displayed when the user is not gazing at the display screen.

For example, the information processing device 3 according to the first embodiment first creates screen data based on information including a plurality of icons (objects) to be displayed and display positions of the icons and causes the display device 2 to display the screen data. In this case, as illustrated in FIG. 4, an image in which a plurality of icons 801 to 807 are arranged at predetermined positions is displayed on the display screen 201 of the display device 2. When it is determined that the user 7 is gazing at the position of the point P on the display screen 201 (YES in Operation S3) when the display screen 201 is in the state illustrated in FIG. 4, the information processing device 3 generates screen data including information indicating a point region BP including the point P and the operation region (not illustrated) (operation S5). Whether or not the user 7 is gazing at the display screen 201 is determined based on a change in the position of the line of sight within a predetermined period (for example, three seconds). In a case where the position of the line of sight of a person is calculated from the image, even in a situation where the user perceives that he/she is continuously viewing one point on the display screen 201, the position of the line of sight finely moves due to fixation fine movement (fine eye shake) and a detection error or the like occurring in image processing. For that reason, the gaze determination unit 330 of the information processing device 3 determines whether or not the user 7 is gazing based on whether or not the distribution of the positions of the line of sight in the past three seconds by using the position of the current line of sight as a reference is within a predetermined range. Here, the predetermined range is, for example, a square region determined based on a range of the line of sight angle considered to be gazing and the distance from the eyeball of the user 7 to the display screen. The range of the line of sight angle considered to be gazing is set based on, for example, the central field of view or the effective field of view of a person. The central field of view is, for example, a field of view within an angular range of about several degrees centered on the line of sight position, has high visual acuity, and is a field of view where fine objects can be visually recognized. The effective field of view is, for example, a field of view within an angular range of about 4 to 20 degrees centered on the line of sight position, and is a field of view that can distinguish wanted information from unwanted information although not as good as the central field of view. For example, in a case where the range of the line of sight angle considered to be gazing is set to 4 degrees, if the distance from the eyeball of the user 7 to the display screen is 50 cm, a square region of which a length H of one side is 3.5 cm is set as a predetermined range. Also, for example, in a case where the range of the line of sight angle considered to be gazing is set to 4 degrees, if the distance from the eyeball of the user 7 to the display screen is 70 cm, a square region of which a length H of one side is 4.9 cm is set as a predetermined range. The distance from the eyeball of the user 7 to the display screen is calculated based on, for example, the distance between the pupils of the user 7 in the image and an imaging range (angle of view) of the imaging device 4. In a case where the distance between the pupils in the image is L1 and the angle of view in the horizontal direction of the imaging device 4 is e degrees, the distance L2 from the eyeball of the user 7 to the display screen can be calculated by the following expression (1).

$$L2=L1/2 \tan(\theta/2) \qquad (1)$$

The central field of view and the effective field of view used for setting the range of the line of sight angle may be information on the field of view of a person who is the user (user) 7, or may be an average value obtained by statistical processing or the like.

Figure 5A:
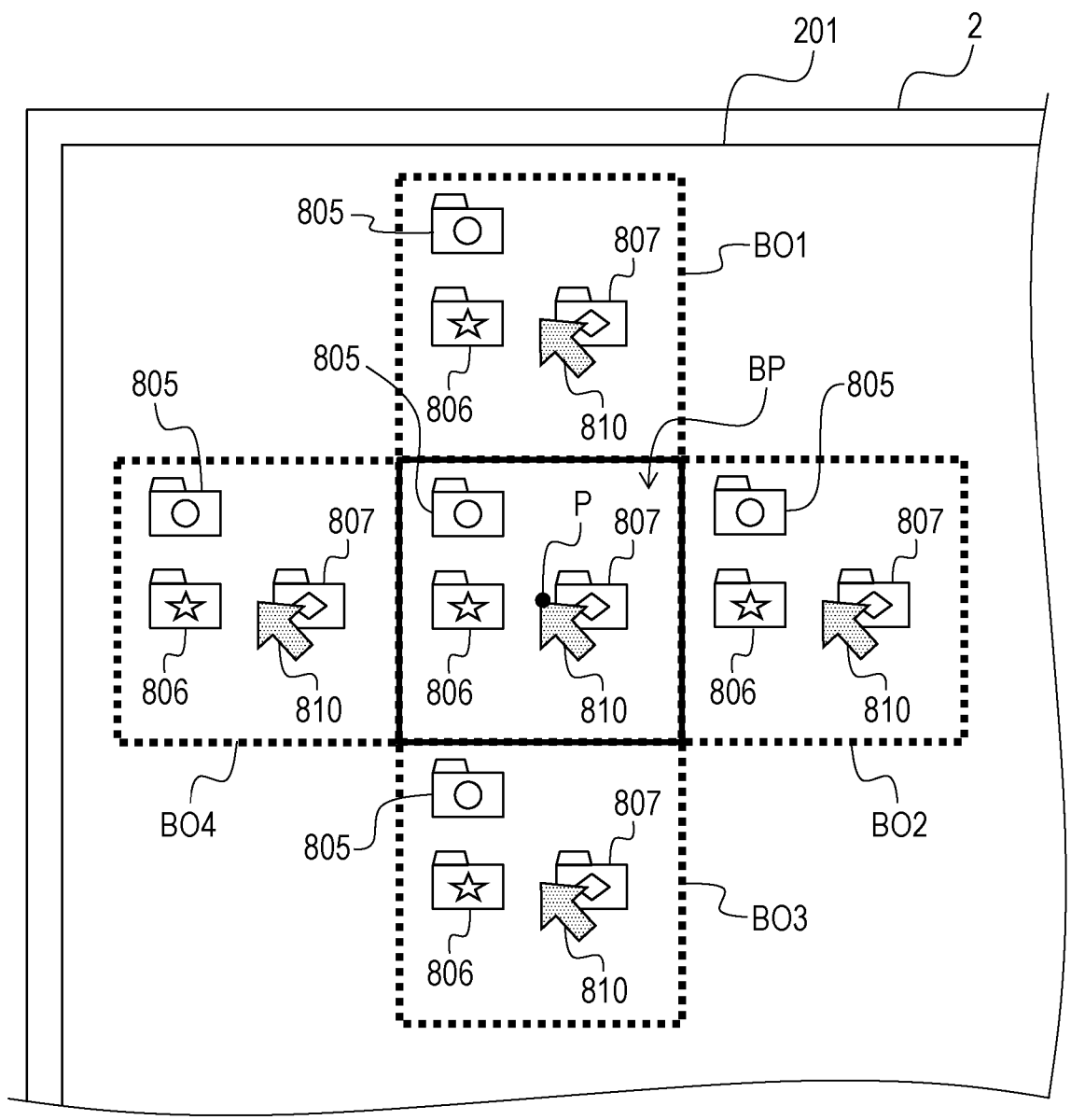
FIG. 5A is a diagram (first view) for explaining a first example of transition of the display screen.
Figure 5B:
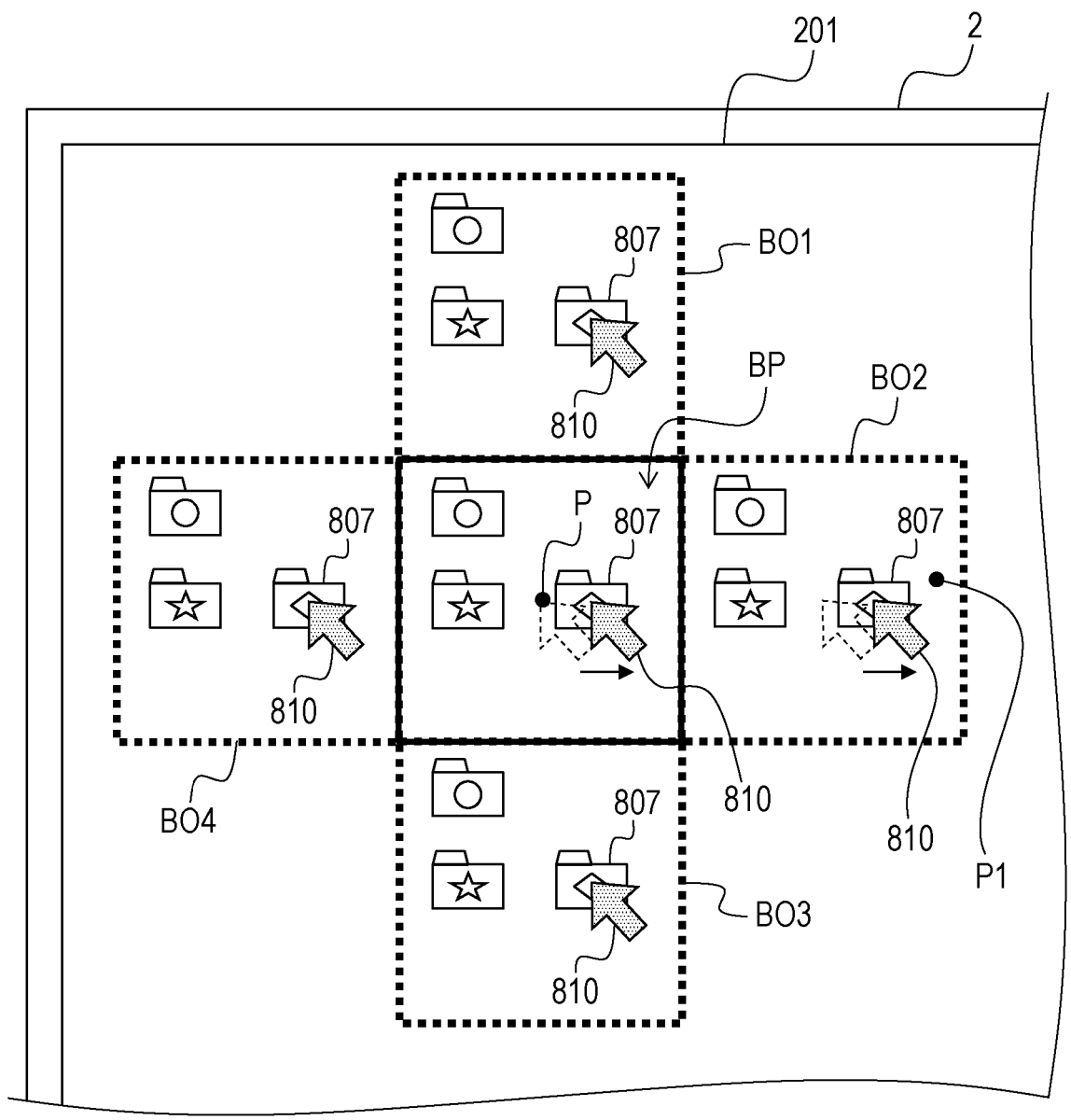
FIG. 5B is a diagram (second view) for explaining the first example of transition of the display screen.
Figure 5C:
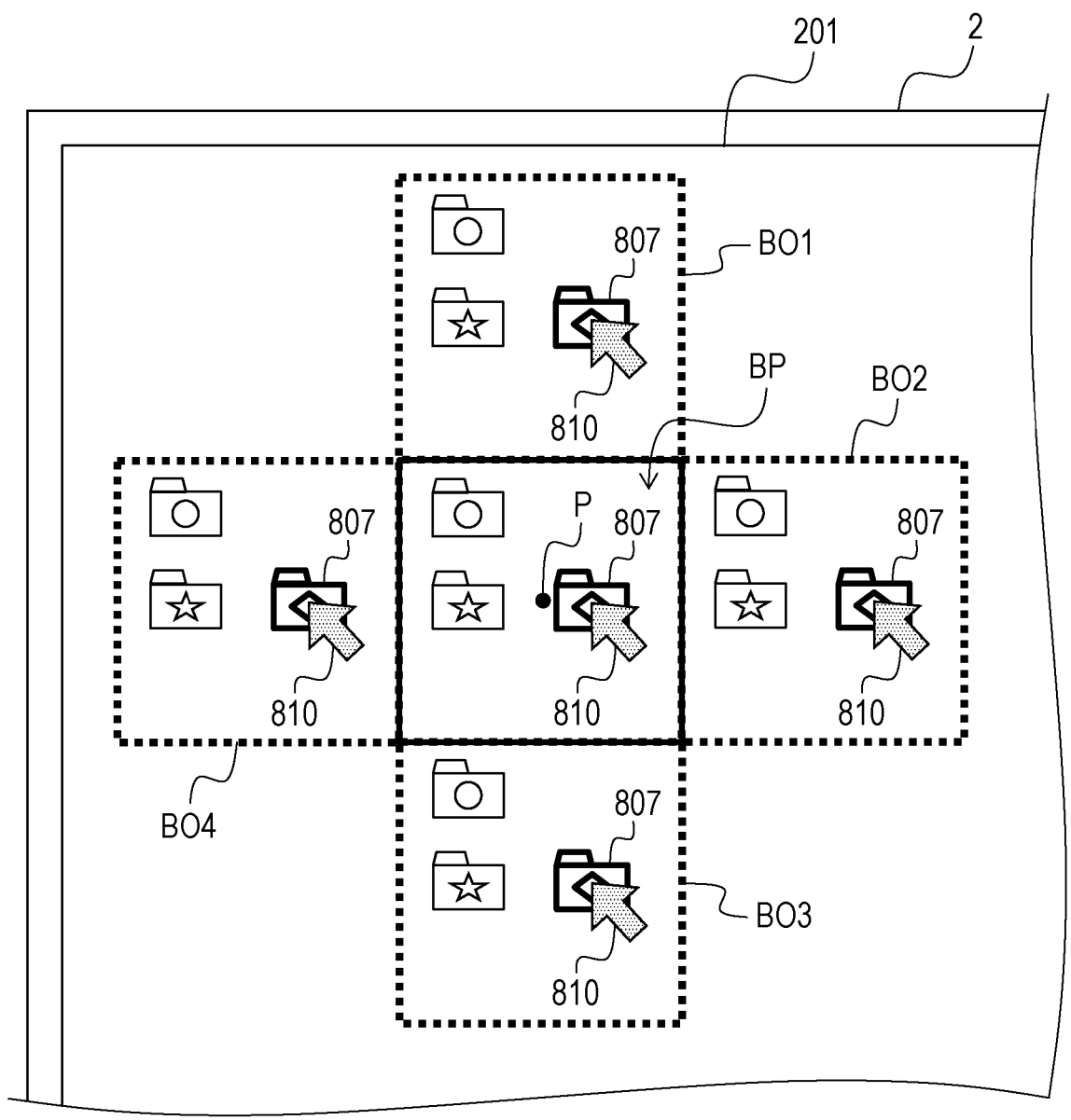
FIG. 5C is a diagram (third view) for explaining the first example of transition of the display screen.

FIG. 5A is a diagram (first view) for explaining a first example of transition of the display screen. FIG. 5B is a diagram (second view) for explaining the first example of transition of the display screen. FIG. 5C is a diagram (third view) for explaining the first example of transition of the display screen.

When the user 7 gazes at the point P on the display screen 201, the information processing device 3 generates, for example, screen data including information indicating the point region BP centered on the point P and the four operation regions BO1 to BO4, and causes the display device 2 to display the screen data. In this case, as illustrated in FIG. 5A, on the display screen 201 of the display device 2, a frame indicating the contour of the point region BP and a frame indicating each of the four operation regions BO1 to BO4 are displayed respectively. In the point region BP, a pointer 810 pointing to the position P of the line of sight is displayed. In this case, the four operation regions BO1 to BO4 are respectively adjacent to the point region BP at above or below the point region BP and left or right of the point region BP. As such, when the user 7 gazes at the point P, the frames indicating the point region BP and the four operation regions BO1 to BO4 are displayed so as to make it possible to notify the user 7 that it is transitioned to a state where the pointer 810 can be moved by line of sight input.

Furthermore, on the display screen 201 of FIG. 5A, the same image information as image information in the point region BP is displayed in each of the four operation regions BO1 to BO4. For example, instead of the icons 803 and 804 (see FIG. 4) displayed before the user 7 gazes at the point P, icons 805 to 807 and the pointer 810 in the point region BP are displayed in the operation region BO1 positioned above the point region BP. As such, the same image information as that in the point region BP is displayed on each of the four operation regions BO1 to BO4 surrounding the point region BP so as to make it possible to notify the user 7 that gazing at any one of the operation regions BO1 to BO4 is sufficient in a case of intending to move the pointer 810.

When it is determined that the user 7 moves the line of sight and gazes at one point in the operation region in a state where the point region BP and the operation regions BO1 to BO4 are displayed on the display screen 201 (YES in Operation S6), the information processing device 3 generates screen data in which the pointer 810 is moved (Operation S7). For example, as illustrated in FIG. 5B, when the user 7 gazes at a point P1 by moving the line of sight to the point P1 within the operation region BO2 positioned on the right side of the point region BP, the information processing device 3 generates screen data in which the pointer 810 in the point region BP is moved to the right. In a case where the same image information as the image information in the point region BP is displayed in the operation regions BO1 to BO4, the pointer 810 in the operation regions BO1 to BO4 on the display screen 201 also moves to the right side. As such, in the information processing device 3 of the first embodiment, in a case of the operation region BO2 which is the outside of the point region BP is being gazed in order to move the pointer 810, the same image information as image information in the point region is displayed in the operation region BO2 being gazed. For that reason, the user 7 can operate the pointer 810 in the point region BP while confirming the position of the pointer 810 with the pointer 810 and the icons 805 to 807 displayed in the operation region BO2 being gazed. That is, the user 7 can operate the pointer 810 while ascertaining the position of the pointer 810 without returning the position of the line of sight to the point region BP. Accordingly, by displaying the screen data created by the information processing device 3 of the first embodiment on the display device 2, it is possible to reduce the movement amount of the line of sight for the purpose of confirming the position of an operation target (pointer) while gazing at the inside of the operation region and performing the line of sight input.

Thereafter, when the user 7 continues to gaze at the inside of the operation region BO2 and the pointer 810 reaches within a range in which the icon 807 can be selected, for example, as illustrated in FIG. 5C, image information within the pointer region BP is changed to information indicating that the icon 807 is selected. In this case, the icon 807 within the operation regions BO1 to BO4 is similarly changed to information indicating that the icon 807 is selected. With this, the user 7 can confirm that the icon 807 is selected by the pointer 810 within the point region BP in a state of gazing at the inside of the operation region BO2. Then, when it is determined that the user 7 who is gazing at the point P1 in the operation region BO2 gazes at the point P, for example, by returning the line of sight to the point P in the point region BP (YES in Operation S8), the information processing device 3 creates screen data in which the pointer 810 is stopped (Operation S9).

As such, when the user 7 gazes at one point inside of the display screen 201, the information processing device 3 creates screen data including information indicating the point region BP and the operation regions BO1 to BO4, and causes the display device 2 to display screen data. In this case, for example, as illustrated in FIGS. 5A to 5C, the information processing device 3 creates screen data in which the same image information as the image information of the point region BP is displayed in each of the operation regions BO1 to BO4. With this, the user 7 can confirm the position of the pointer 810 within the point region in a state of gazing at the inside of the operation region. For that reason, the user 7 can reduce the movement amount of the line of sight for the purpose of confirming the position of the operation target (pointer) while gazing at the inside of the operation region and performing the line of sight input. The pointer movement operation can be performed without returning the line of sight to the point region BP and thus, for example, it is possible to avoid occurrence of unintended input operation (for example, backward movement of the pointer) by returning the line of sight to the point region BP. Therefore, according to the first embodiment, it is possible to improve operability of the input operation by the line of sight.

Figure 6A:
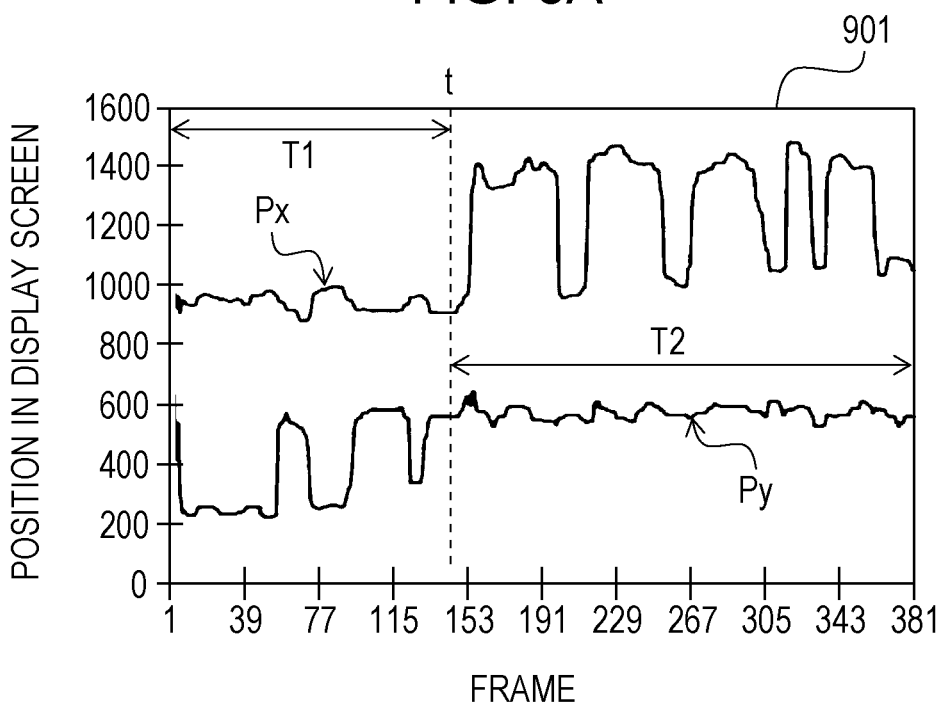
FIGS. 6A and 6B are graphs illustrating an example of a temporal change in a position of the line of sight of the user when a pointer is moved.
Figure 6B:
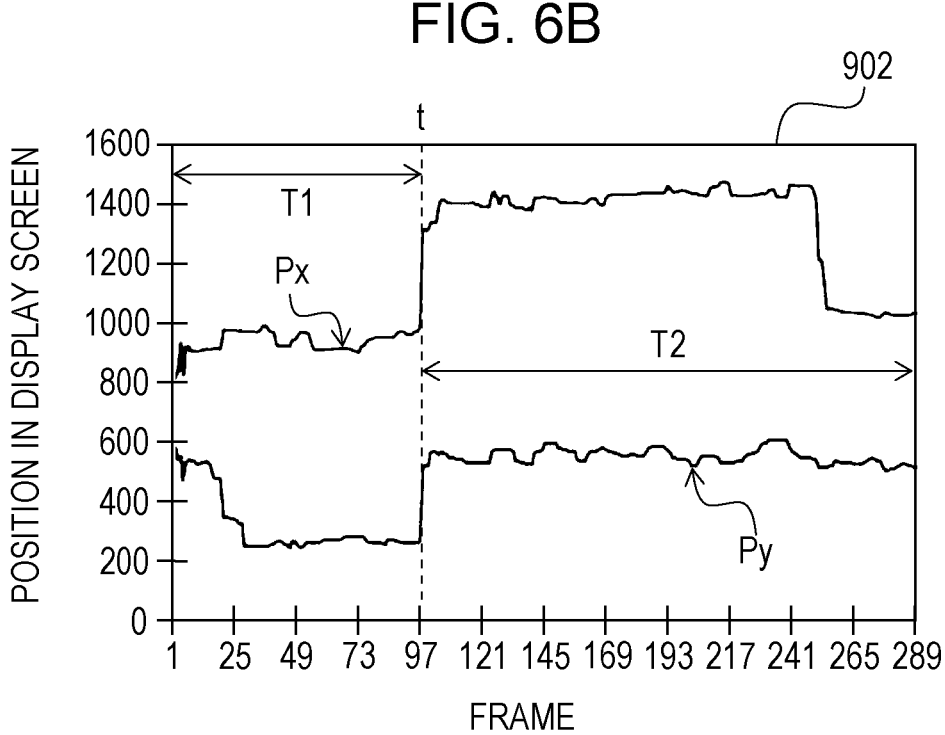

FIGS. 6A and 6B are graphs illustrating an example of a temporal change in the position of line of sight of the user when a pointer is moved. A graph 901 in FIG. 6A illustrates an example of the temporal change in the position of the line of sight in a case where image information of the pointer region is not displayed in the operation region. On the other hand, a graph 902 in FIG. 6B illustrates an example of the temporal change in the position of the line of sight in a case where the image information in the pointer region is displayed within the operation region.

The graphs 901 and 902 respectively illustrate the temporal change in the position of the line of sight in a case where the pointer 810 displayed on the display screen 201 is moved upward by a first distance and then moved to the right by a second distance. In the vertical axis in the graphs 901 and 902, the left end of the display screen 201 is set as 0 for the horizontal position Px and the upper end of the display screen 201 is set as 0 for the vertical position Py.

In a case where the image information in the pointer region is not displayed within the operation region, as illustrated in the graph 901, there are only three places where the position Py of the line of sight is largely moved within a period T1 during which the pointer is moved upward. This indicates that the position Py of the line of sight is moved between the operation region and the point region within the period T1 during which the pointer is moved upward. In a case where the image information in the pointer region is not displayed within the operation region, as illustrated in the graph 901, there are five places where the position Px of the line of sight is largely moved within a period T2 during which the pointer is moved to the right. This indicates that the position Px of the line of sight is moved between the operation region and the point region within the period T2 during which the pointer is moved to the right. As such, in a case where the image information in the pointer region is not displayed within the operation region, the line of sight of the user 7 is repeatedly moving between the point within the operation region for moving the pointer and the point within the point region plural times in order to confirm the position of the pointer.

In contrast, in a case where the image information in the pointer region is displayed in the operation region, as illustrated in the graph 902, change indicating that the position Py of the line of sight is repeatedly moving between the operation region and the point region is not observed within the period T1 during which the pointer is moved upward. Similarly, in a case where the image information in the pointer region is displayed in the operation region, as illustrated in the graph 902, change indicating that the position Px of the line of sight is repeatedly moving between the operation region and the point region is not observed within the period T2 during which the pointer is moved to the right. That is, the user can operate the pointer while ascertaining the position of the pointer within the pointer region different from the operation region, in a state of gazing at the operation region, by displaying the image information in the pointer region within the operation region.

Furthermore, when comparing the time taken to complete the movement of the pointer, the case where the image information in the pointer region is not displayed within the operation region is about 350 frame periods, whereas the case where the image information in the pointer region is displayed within the operation region is about 250 frame periods. Therefore, it is possible to reduce the movement amount of the line of sight and smoothly move the pointer in a short period of time and thus, operability of the input operation by the line of sight is improved, by displaying the image information in the pointer region within the operation region as in the first embodiment.

FIGS. 5A to 5C are merely examples of transition of the display screen. For example, when screen data in which a frame indicating a point region and an operation region is superimposed is created, the same image information as the image information of the point region may be displayed only in the operation region including the position being gazed by the user in the operation region.

Figure 7A:
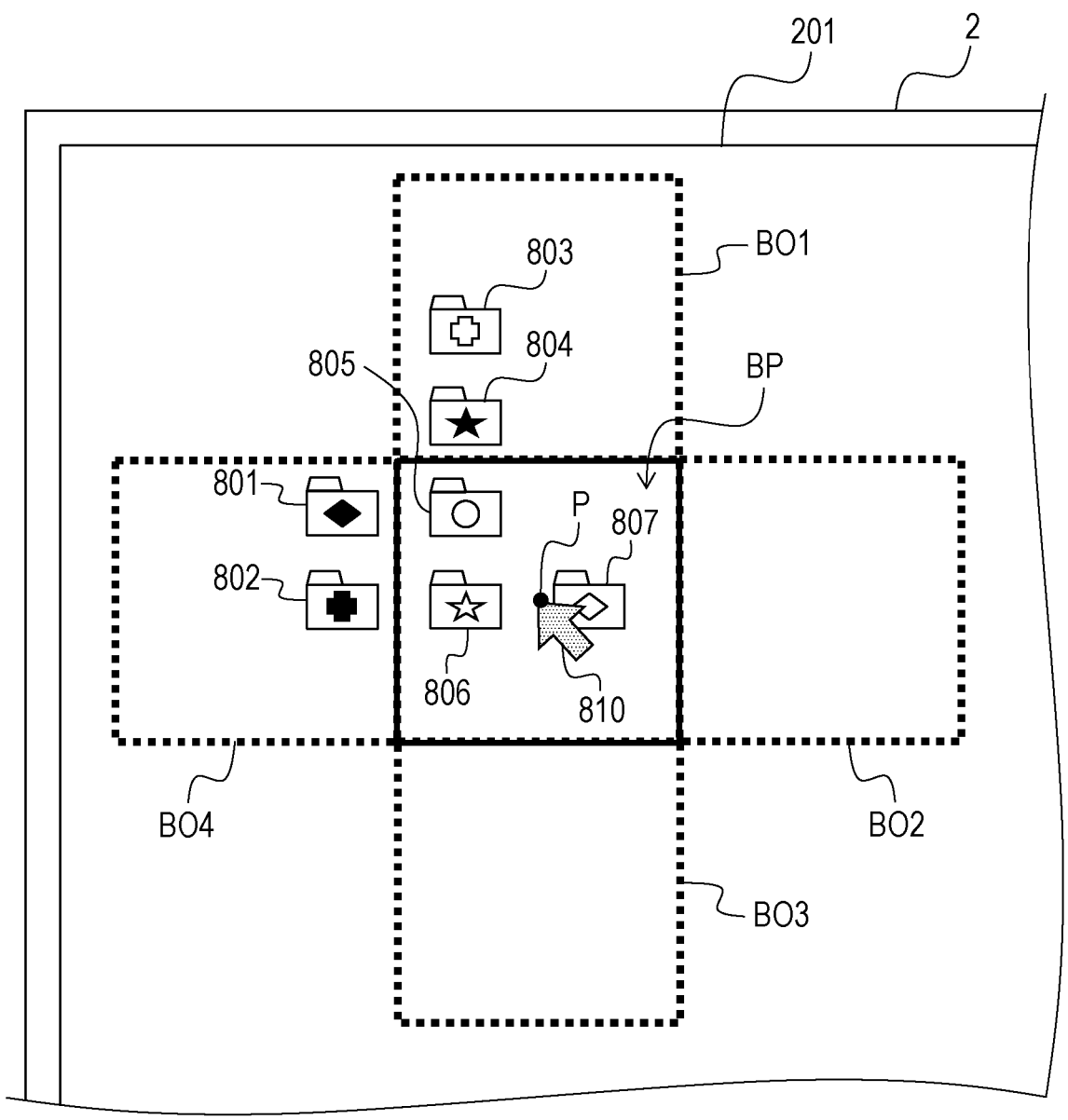
FIG. 7A is a diagram (first view) for explaining a second example of transition of the display screen.
Figure 7B:
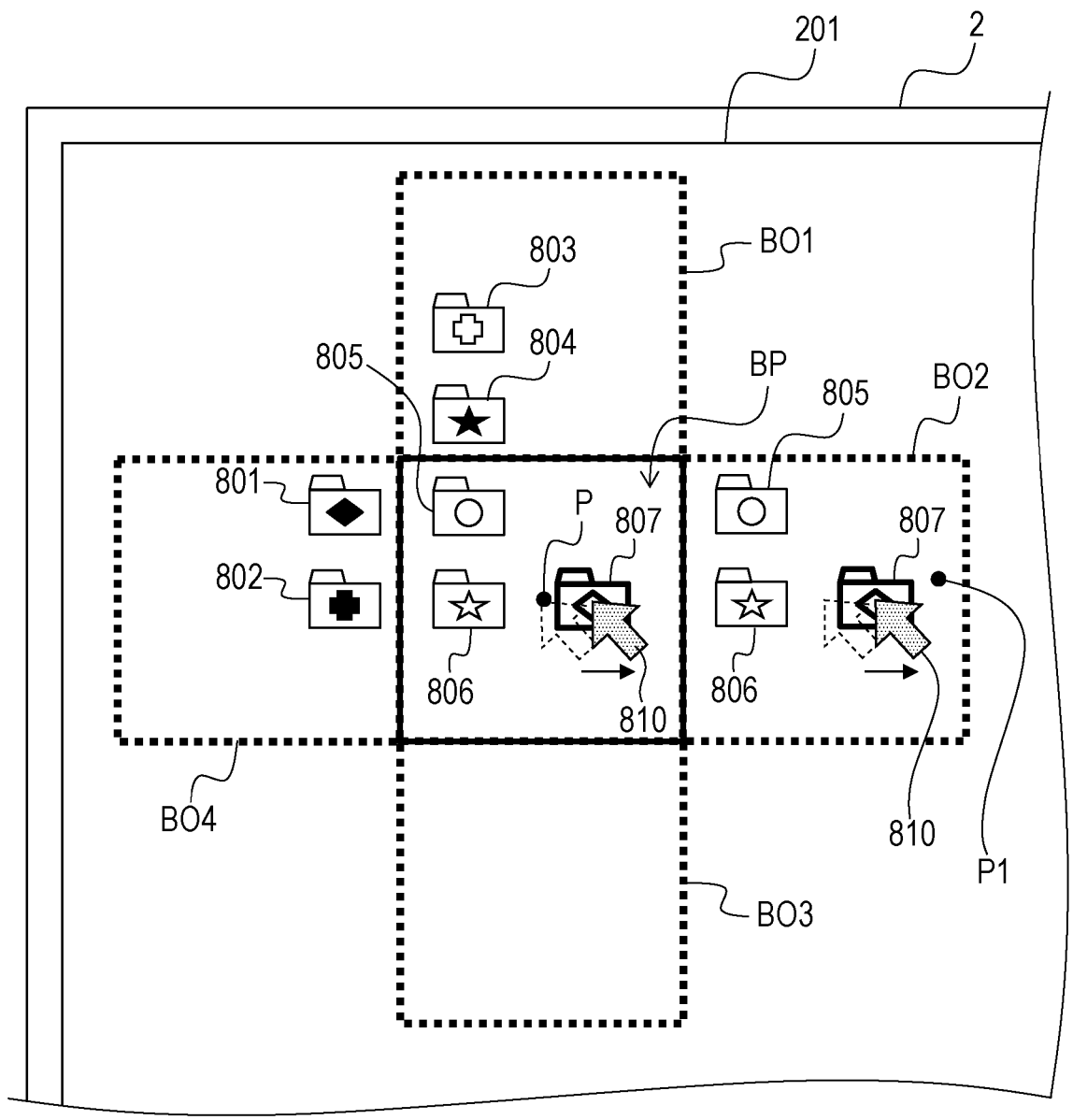
FIG. 7B is a diagram (second view) for explaining the second example of transition of the display screen.
Figure 7C:
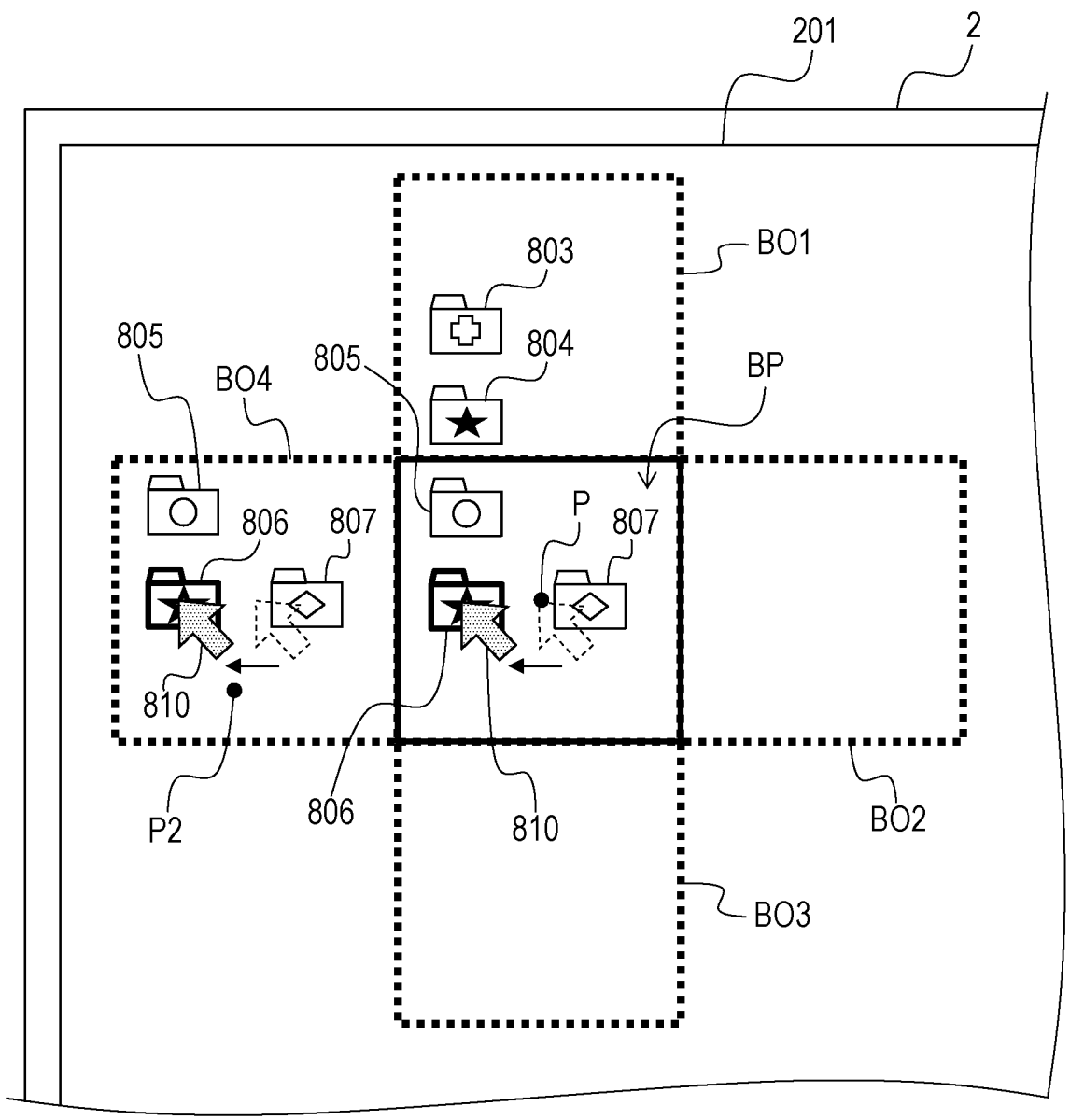
FIG. 7C is a diagram (third view) for explaining the second example of transition of the display screen.

FIG. 7A is a diagram (first view) for explaining a second example of transition of the display screen. FIG. 7B is a diagram (second view) for explaining the second example of transition of the display screen. FIG. 7C is a diagram (third view) for explaining the second example of transition of the display screen.

In a case where the user 7 gazes at the point P on the display screen 201 illustrated in FIG. 4, the information processing device 3 performs processing (Operation S5 in FIG. 3) of creating screen data including information indicating the point region BP and the operation regions BO1 to BO4. In this case, for example, as illustrated in FIG. 7A, the information processing device 3 may create the frame indicating the contour of the point region BP, the frame indicating the contour of each of the operation regions BO1 to BO4, and the screen data on which only the pointer 810 is superimposed and display the frames and the screen data on the display device 2. In this case, image information displayed in each of the operation regions BO1 to BO4 is the same image information as image information of each region displayed on the display screen 201 at the time of creating the screen data. For example, in the operation region BO1 positioned above the pointer region BP, the icons 803 and 804 displayed on the display screen 201 of FIG. 4 are displayed.

If the user 7 gazes in the operation region when display of the display screen 201 is in the state of FIG. 7A, the information processing device 3 performs processing (Operation S7 in FIG. 3) of creating screen data in which the pointer 810 is moved. In this case, the information processing device 3 creates screen data in which only the image information in the operation region being gazed by the user 7 is replaced by the same image information as the image information in the point region BP. For example, as illustrated in FIG. 7B, in a case where the user 7 is gazing at the point P1 within the operation region BO2 positioned on the right side of the point region BP, the same image information (icons 805 to 807 and the pointer 810 moving to the right) as in the pointer area BP is displayed in the operation region BO2. In this case, the image information before setting the region remains as it is, in each of the other operation regions BO1, BO3, and BO4. For that reason, the user 7 can operate the pointer 810 while confirming the position of the pointer 810 in the point region BP, the icons 803 and 804 in the operation region BO1, and the icons 801 and 802 in the operation region BO4 as well. For example, as illustrated in FIG. 7C, in a case where the user 7 is gazing at the point P2 of the operation region BO4 positioned on the left side of the point region BP, the same image information (icons 805 to 807 and pointer 810 moving to the left) as in the pointer region BP is displayed in the operation region BO4. For that reason, the operation of the pointer 810 is not hindered by the icons 801 and 802 of which display positions are within the operation region BO4. As such, by replacing only the operation region being gazed by the user 7 with the same image information as the image information in the point region BP, it is possible to reduce the possibility that a large number of the same image information as the image information is displayed in the point region BP and the display becomes difficult to understand.

Figure 8:
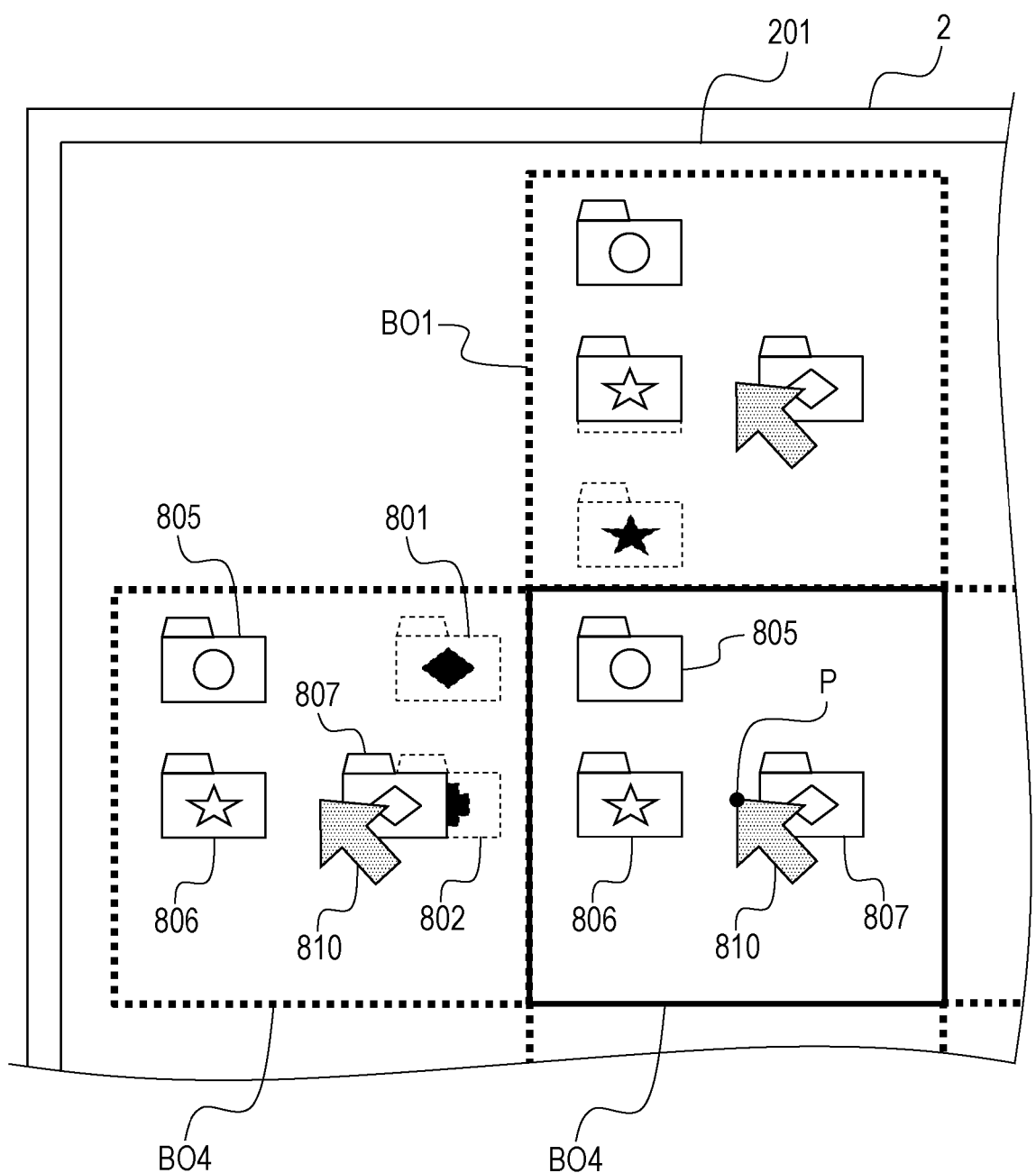
FIG. 8 is a diagram for explaining another example of display in an operation region.

FIG. 8 is a diagram for explaining another example of display in an operation region. In the first example and the second example regarding transition of the display screen, screen data in which image information in the operation region is replaced with image information in the point region is created and displayed on the display device 2, respectively. However, when image information in the point region is displayed in the operation region, not only the image information is replaced, but also image information in the point region BP may be superimposed on the image information in the operation regions BO1 and BO4, as illustrated in FIG. 8. In the case of creating screen data in which image information in the point region is superimposed on the image information in the operation region, for example, image information in the point region is superimposed in a direction that is closer to the front side than the image information in the operation region viewed from the user 7 and image information in the point region is transparently displayed. For example, in the operation region BO4 on the display screen 201 of FIG. 8, the icons 801 and 802 displayed before the region is set are displayed together with the image information (icons 805 to 807 and pointer 810) within the point region BP. As such, by making the display in the operation region in such a display that the image information in original screen data is superimposed with the image information in the point region, it becomes easy to identify the point region, for example.

Figure 9:
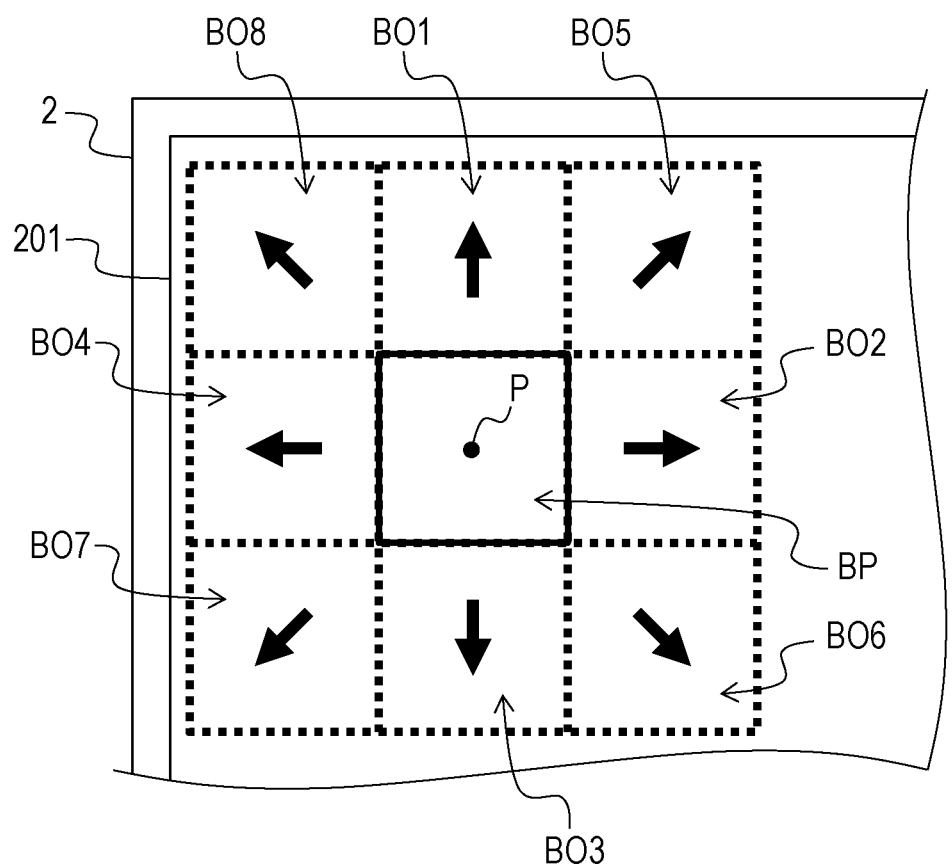
FIG. 9 is a diagram for explaining another example of a method of setting the operation region.

FIG. 9 is a diagram for explaining another example of a method of setting the operation region. In the first example of transition of the display screen described above, the operation regions BO1 to BO4 for moving the pointer 810 are respectively set at above and below the point region BP and right and left of the point region BP. However, the method of setting the operation region is not limited thereto, and as illustrated in FIG. 9, eight operation regions BO1 to BO8 may be set. In a case where eight operation regions are set outside the point region BP, for example, the movement direction of the pointer can be divided into eight directions. That is, by setting eight operation regions BO1 to BO8 as illustrated in FIG. 9, in addition to moving the pointer in four directions, upward direction, downward direction, rightward direction, and leftward direction, it is also possible to move the pointer diagonally upward to the right, diagonally downward to the right, diagonally upward to the left, and diagonally downward to the left, respectively. For example, in the case of moving the pointer diagonally upward to the right by the line of sight input, the user 7 may gaze at the operation region BO5 positioned diagonally upward right of the pointer region BP. For that reason, in the case of moving the pointer diagonally upward to the right, it is possible to suppress an increase in the movement amount and the number of times of movement of the line of sight by repeating gazing at the upper operation region and gazing at the right operation region. Therefore, operability in performing the operation of moving the pointer by the line of sight input is further improved.

Figure 10A:
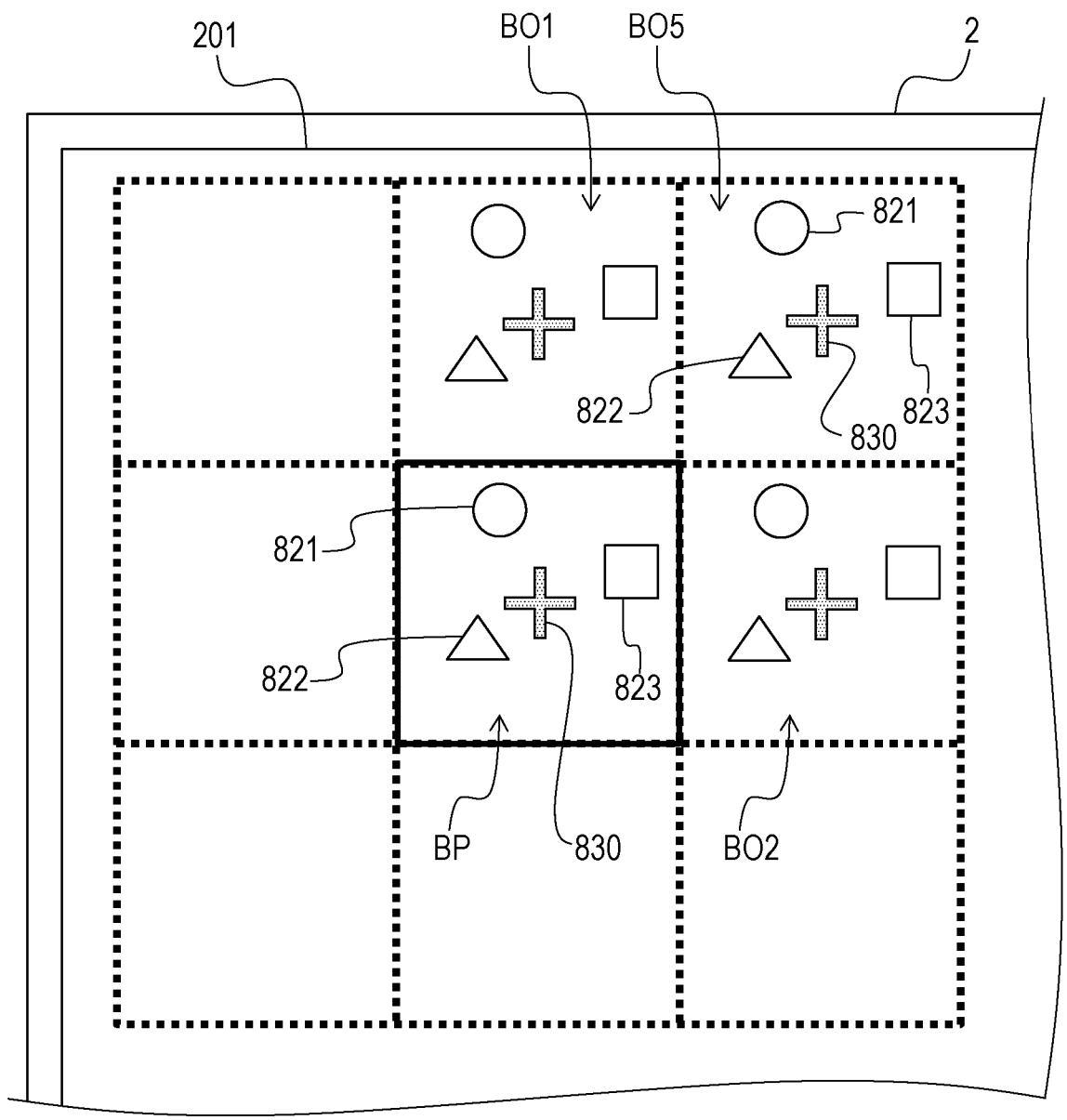
FIG. 10A is a diagram (first view) for explaining a third example of transition of the display screen.
Figure 10B:
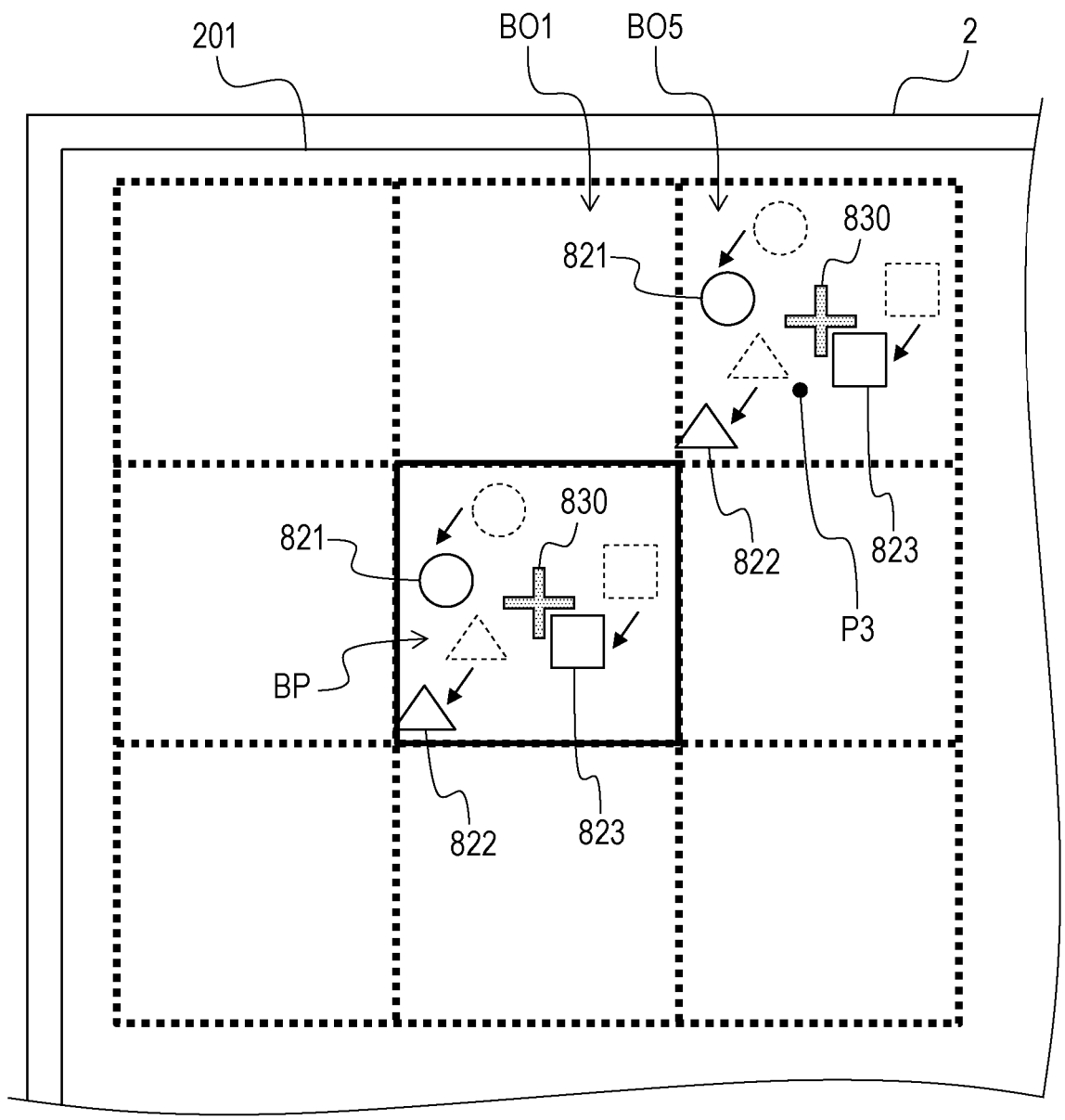
FIG. 10B is a diagram (second view) for explaining the third example of transition of the display screen.

FIG. 10A is a diagram (first view) for explaining a third example of transition of the display screen. FIG. 10B is a diagram (second view) for explaining the third example of transition of the display screen.

In the example of the transition of the display screen described above, screen data that the display position of the pointer 810 displayed within the point region BP moves (varies) is created and displayed on the display device 2. However, screen data to be created is not limited to thereto, and may be screen data in which the background displayed on the display screen 201 of the display device 2 moves. For example, in the point region BP on the display screen 201 of the display device 2 illustrated in FIG. 10A, a marker 830 and objects 821 to 823 are displayed. Although a portion is omitted in FIG. 10A, eight operation regions are set outside the point region BP, and the same image information as the image information in the point region BP is displayed within each operation region. In the above explanation described with reference to FIG. 9, in a case where the user gazes at the operation region BO5 positioned diagonally upward right of the point region BP in such a display state, screen data in which the marker 830 moves diagonally upward to the right in the information processing device 3 is created and displayed on the display device 2.

In contrast, in the third example of transition of the display screen, in a case where the user gazes at the operation region BO5, the information processing device 3 creates screen data in which the background is moved diagonally downward to the left. That is, as illustrated in FIG. 10B, in the display within the point region BP on the display screen 201 of the display device 2, objects 821 to 823 are moved diagonally downward to the left, respectively, and the position of the marker 830 does not change. Furthermore, similarly to the display in the point region BP, in the display in the operation region BO5 being gazed by the user 7, the objects 821 to 823 are moved diagonally downward to the left, respectively, and the position of the marker 830 does not change.

As such, in a case where the background is moved according to the position being gazed by the user, it is possible to move a desired object displayed on the display screen 201 to a specific position (for example, the center of the display screen 201) in the display screen 201. Such a display method can be applied to, for example, display of a map in a car navigation system.

FIG. 11 is a diagram for explaining still another example of the method of setting the point region and the operation region. When the point region BP is set, for example, as illustrated in FIG. 11, the display screen 201 of the display device 2 may be previously divided into a plurality of partial regions B11 to B64 and the partial region B42 including the position being gazed may be set as the point region BP. In this case, it is set that the operation regions BO1 to BO4 are partial regions B41, B32, B52, and B43 adjacent to the partial region B42 which is set as the point region BP, among the plurality of partial regions B11 to B64. Here, the display screen 201 is divided into partial regions each of which has dimensions corresponding to a predetermined range H defined based on the position being gazed by the user 7, the effective field of view, and the like. By doing as such, for example, it is possible to mechanically determine the point region BP and the operation regions BO1 to BO4 depending on which partial region among the partial regions B11 to B64 the position being gazed by the user 7 is included. For that reason, as compared with a case where the point region BP and the operation regions BO1 to BO4 are calculated each time based on the position gazed by the user 7 and a predetermined range determined based on the effective field of view and the like, the load due to arithmetic processing in the information processing device 3 is reduced.

Figure 12:
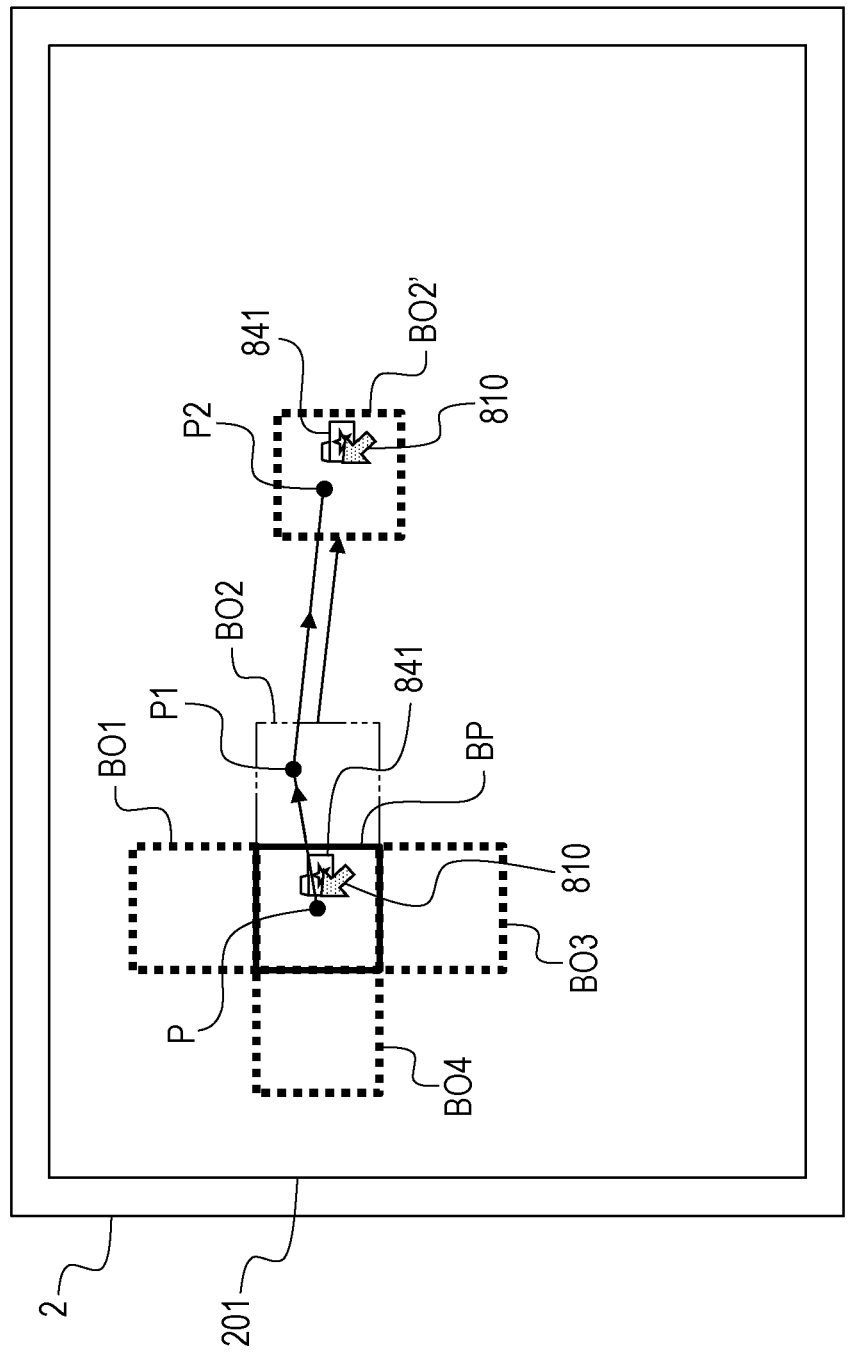
FIG. 12 is a diagram for explaining an application example of a method of displaying the operation region.

FIG. 12 is a diagram for explaining an application example of a method of displaying the operation region. In the method of displaying the point region and the operation region, the operation region is adjacent to the point region. However, the display position of the operation region is not limited to thereto, and can be appropriately changed. For example, in FIG. 12, the point region BP and the operation regions BO1 to BO4 are displayed when the user 7 gazes at the point P1 positioned on the right side of the point region BP and gazes at the point P2 which is positioned on the further right side after gazing at the point P on the display screen 201 of the display device 2. When the user 7 is gazing at the point P1, the region indicated by the two-dot chain line in FIG. 12 is set as the operation region BO2, and the same image information as the image information within the point region BP is displayed in the operation region BO2. Thereafter, when the user 7 moves the line of sight to the point P2, the information processing device 3 moves the operation region BO2 to the right according to the movement of the line of sight. As such, by moving the operation region according to the movement of the line of sight, for example, the user 7 can perform the operation on the point region while viewing image information or the like displayed at a position far from the point region (processing target region). With this, for example, it is possible to acquire other information and confirm the next operation to be performed while performing the operation on the point region (processing target region), so that operability of the input operation by the line of sight is further improved.

In the first embodiment, the example in which the pointer 801 or the like in the display screen 201 is moved by the line of sight input is described, but the information processing device 3 according to the first embodiment is not limited thereto, and it is possible to combine with other operations using the line of sight in the information processing device 3. For example, the information processing device 3 may further include a detection unit that detects blinking of the user 7 from the image captured by the imaging device 4, and may execute predetermined processing when blinking is detected.

Furthermore, the information processing device 3 according to the first embodiment is applicable not only to the display system 1 of FIG. 1 but also to various display systems that perform processing corresponding to an input operation by a line of sight. The information processing device 3 may be an electronic device integrated with the display device 2, the imaging device 4, and the infrared light source 5.

Second Embodiment

Figure 13:
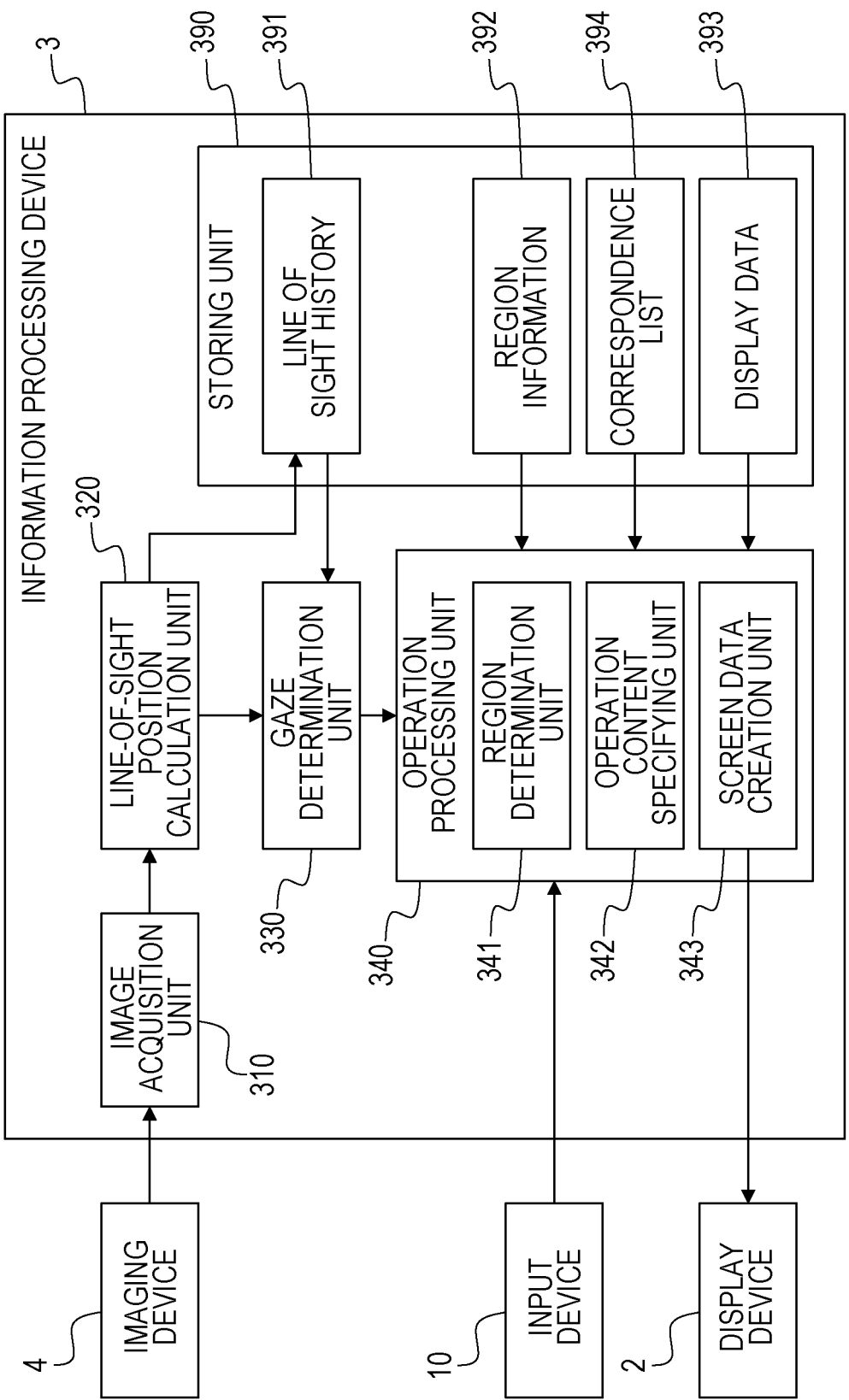
FIG. 13 is a diagram illustrating a functional configuration of an information processing device according to a second embodiment.

FIG. 13 is a diagram illustrating a functional configuration of an information processing device according to a second embodiment.

As illustrated in FIG. 13, the information processing device 3 according to the second embodiment includes an image acquisition unit 310, a line-of-sight position calculation unit 320, a gaze determination unit 330, and an operation processing unit 340. The information processing device 3 according to the second embodiment includes a storing unit 390 that stores various pieces of information including a line of sight history 391, region information 392, display data 393, and a correspondence list 394.

Each of the image acquisition unit 310, the line-of-sight position calculation unit 320, and the gaze determination unit 330 in the information processing device 3 has the function described in the first embodiment.

In addition to the function described in the first embodiment, the operation processing unit 340 in the information processing device 3 of the second embodiment performs display screen switching processing and the like based on operation information input from an input device 10. The input device 10 is capable of inputting operation information and the like by a method of a keyboard device, a touch panel device, and the like, different from the line of sight input. The operation processing unit 340 according to the second embodiment can perform an operation different from the movement of the pointer by the line of sight input based on the correspondence list 394 stored in the storing unit 390, for example. The operation processing unit 340 includes a region determination unit 341, an operation content specifying unit 342, and a screen data creation unit 343.

Figures 14A, 14B:
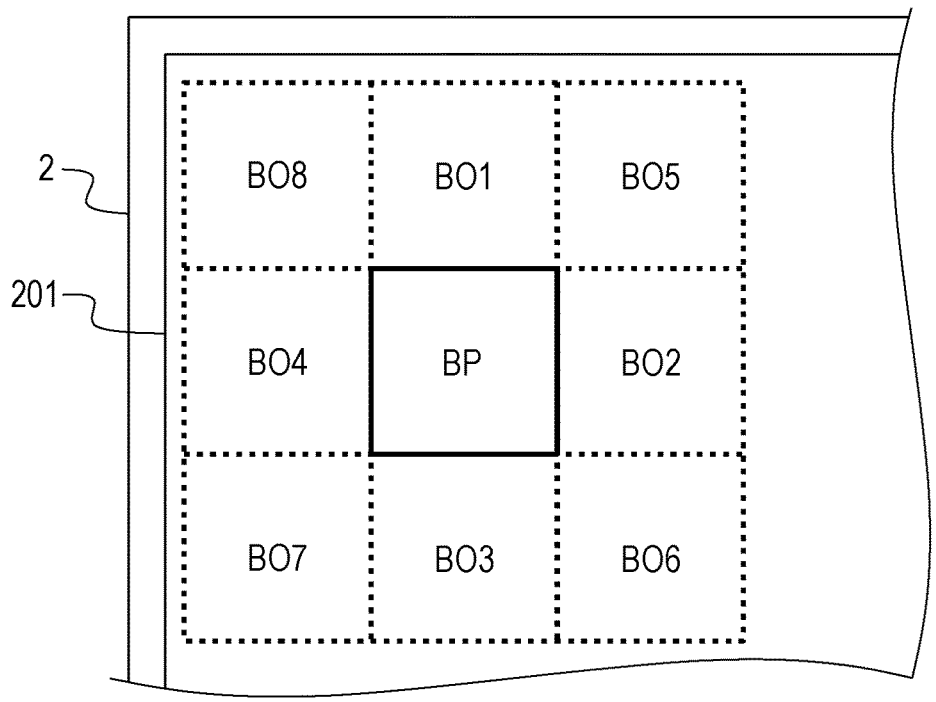
FIGS. 14A and 14B are diagrams for explaining an example of the operation region and a correspondence list.

FIGS. 14A and 14B are diagrams for explaining an example of an operation region and a correspondence list. The information processing device 3 of the second embodiment specifies an operation content corresponding to an operation region including the position being gazed by the user 7, based on the correspondence list 394. FIG. 14A illustrates the point region BP and eight operation regions BO1 to BO8. In the first embodiment, an example in which all of these eight operation regions BO1 to BO8 are allocated to operations for moving the pointer 810 is described (see FIG. 9). In contrast, in the second embodiment, for example, as in the correspondence list 394 illustrated in FIG. 14B, four operation regions BO1 to BO4 among the eight operation regions BO1 to BO8 are allocated to the operation of moving the pointer 810 and the remaining operation regions BO5 to BO6 are allocated to another operation. In the correspondence list 394 of FIG. 14B, an operation of moving the pointer to the nearest object is associated with the operation region BO5 positioned diagonally upward right of the point region BP. That is, in a case where the user 7 gazes at the operation region BO5, the information processing device 3 generates screen data in which the pointer 810 is moved to a position at which an object closest to the display position of the current pointer can be selected and causes the display device 2 to display the screen data. In addition, in the correspondence list 394 of FIG. 14B, the operation to shift to a character input mode is associated with the operation region BO6 positioned diagonally downward right of the point region BP. That is, when the user 7 gazes at the operation region BO6, the information processing device 3 shifts to the character input mode. The information processing device 3 shifted to the character input mode generates screen data in which character information input by operating the input device 10 is superimposed on the position indicated by the pointer 810, for example, and causes the display device 2 to display the screen data.

In the correspondence list 394 of FIG. 14B, an operation of canceling the setting of the region is associated with the operation region BO7 positioned diagonally downward left of the point region BP. That is, in a case where the user 7 gazes at the operation region BO7, the information processing device 3 cancels the settings of the pointer region BP and the operation regions BO1 to BO8, generates screen data in which information indicating each region and the pointer is erased, and causes the display device 2 to display the screen data. In the correspondence list 394 of FIG. 14B, an operation of clicking a target is associated with the operation region BO8 positioned diagonally upward left of the point region BP. That is, in a case where the user 7 gazes at the operation region BO8 in a state where an object such as an icon is selected by the pointer 810, the information processing device 3 executes predetermined processing on the selected object (target). Furthermore, the information processing device 3 creates screen data after execution of the predetermined processing and causes the display device 2 to display the screen data. Processing on the target is, for example, processing for displaying text data and image data associated with the target.

The operation content of each operation region in the correspondence table 394 is not limited to the operation content illustrated in FIG. 14B, and can be changed as appropriate. That is, the correspondence table 394 may be stored in the storing unit 390 in a form that can be edited using the input device 10.

Figure 15:
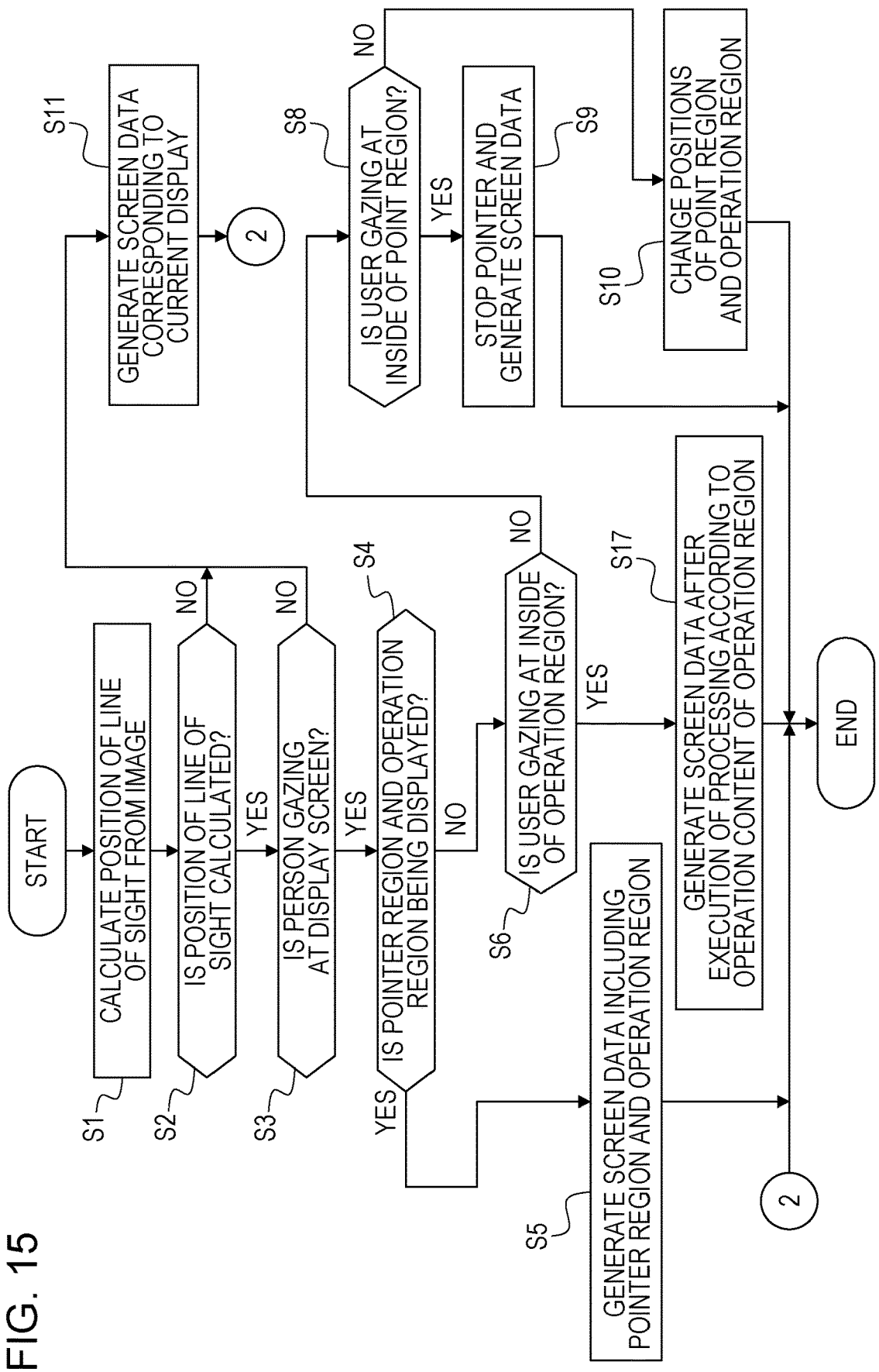
FIG. 15 is a flowchart illustrating processing performed by the information processing device according to the second embodiment.

The information processing device 1 of the second embodiment generates predetermined screen data, outputs the screen data to the display device 2, starts processing of acquiring an image from the imaging device 4, and then, the processing accordance to the flowchart of FIG. 15 is repeated, for example, at predetermined time intervals.

FIG. 15 is a flowchart illustrating processing performed by the information processing device according to the second embodiment. The flowchart in FIG. 15 differs from the flowchart in FIG. 3 only in processing that follows the case where the user 7 is gazing at the operation region (YES in Operation S6). Accordingly, a detailed description of the processing in the flowchart of FIG. 15 redundant with that of the flowchart of FIG. 3 is omitted.

First, the information processing device 3 according to the second embodiment selects an image which becomes a processing target, and performs line of sight position calculation processing (Operation S1) using the selected image. Line of sight position calculation processing is performed by the line-of-sight position calculation unit 320. The line-of-sight position calculation unit 320 first performs processing of detecting a line of sight of a person from an image according to a known line of sight detection method. In a case where the position of the line of sight is calculated, the line-of-sight position calculation unit 320 stores the detection result including the calculated line of sight position and information indicating the imaging time of a processing target image in the line of sight history 391.

When the line of sight position calculation processing is ended, the information processing device 3 next determines whether or not the position of the line of sight is calculated (Operation S2). In a case where it is determined that the position of the line of sight is not calculated (NO in Operation S2), the information processing device 3 generates screen data corresponding to the current display on the display device 2 and outputs the screen data to the display device 2 (Operation S11). When processing in Operation S11 is performed, the information processing device 3 ends processing on the selected image.

In a case where it is determined that the position of the line of sight is calculated (YES in Operation S2), the information processing device 3 next determines, based on the history of the line of sight position, whether or not the person appearing in the image is gazing at one point within the display screen 201 of the display device 2 (Operation S3). In a case where it is determined that the person appearing in the image is not gazing at the inside of the display screen 201 (NO in Operation S3), the information processing device 3 performs processing in Operation S11 and ends processing on the selected image.

In a case where it is determined that the person appearing in the image is gazing at the inside of the display screen 201 (YES in Operation S3), the information processing device 3 next determines whether or not the point region and the operation region are being displayed on the display screen 201 (Operation S4). In a case where it is determined that the pointer region and the operation region are not yet displayed (NO in Operation S4), the information processing device 3 generates screen data including information indicating the pointer region and the operation region and outputs the screen data to the display device 2 (Operation S5). Processing in Operation S5 is performed by the region determination unit 341 and the screen data creation unit 343 of the operation processing unit 340. The screen data generated in Operation S5 may be screen data in which the frame indicating the point region and the operation region are superimposed on the pointer or screen data in which the image information in the operation region is replaced with the same image information as the image information in the pointer region. When processing in Operation S5 is performed, the information processing device 3 ends processing on the selected image.

In a case where it is determined that the point region and the operation region are being displayed on the display screen 201 (YES in Operation S4), the information processing device 3 next determines whether or not the inside of the operation region is being gazed (Operation S6). In a case where it is determined that the user is gazing at the inside of the operation region (YES in Operation S6), the information processing device 3 specifies the operation content based on the operation region being gazed by the user and the correspondence list 394, generates screen data after execution of the processing according to the operation content, and outputs the screen data to the display device 2 (Operation S17).

Processing in Operation S17 is performed by the operation content specifying unit 342 and the screen data creation unit 343 of the operation processing unit 340. In the case of performing processing in Operation S17, the operation content specifying unit 342 specifies the operation content based on the operation region including the position being gazed by the user 7 and the correspondence list 394. In the case of performing processing in Operation S17, the screen data creation unit 343 creates screen data after execution of processing corresponding to the specified operation content. For example, in a case where the operation content is an operation to move the pointer, the screen data creation unit 343 generates screen data in which the pointer is moved in the movement direction associated with the operation region being gazed. In a case where the operation content corresponding to the operation region being gazed is not an operation to move the pointer, the screen data creation unit 343 generates screen data after execution of processing according to the operation content. For example, in a case where the operation content is an operation of clicking the target, the screen data creation unit 343 generates screen data in which text data and image data associated with the target are displayed.

In a case where the operation content is an operation different from the operation of canceling the setting of the region, the screen data creation unit 343 generates screen data in which, for example, the image information of the operation region being gazed by the user is replaced with the image information in the point region BP. The screen data to be generated may be one in which only the image information in some of the plurality of operation regions is replaced with the image information in the pointer region BP or in which the image information in all operation regions is replaced with image information in the pointer region BP. Furthermore, the image information within the operation region in the screen data to be generated may be information for transparently displaying image information in the pointer region BP to be superimposed on the original image information.

When processing in Operation S17 is performed, the information processing device 3 ends processing on the selected image.

In contrast, in a case where it is determined that the user is not gazing at the inside of the operation region (NO in Operation S6), the information processing device 3 next determines whether or not the user is gazing at the inside of the point region (Operation S8). In a case where it is determined that the user is gazing at the inside of the pointer region (YES in Operation S8), the information processing device 3 stops the pointer, generates image data in which image information corresponding to the image information in the point region is included in the operation region, and outputs the image data to the display device 2 (Operation S9).

Figure 16:
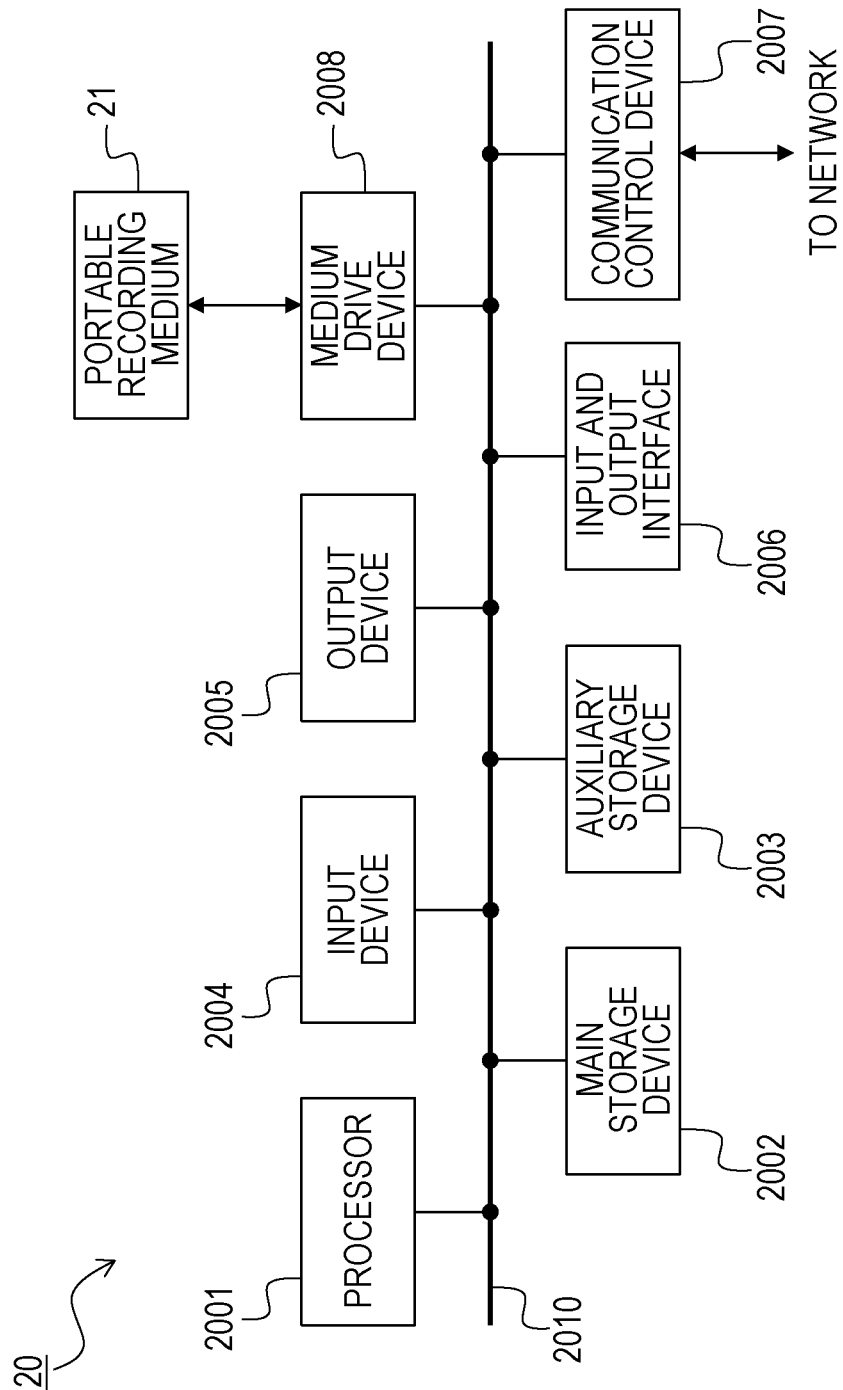
FIG. 16 is a diagram illustrating a hardware configuration of a computer.

On the other hand, in a case where it is determined that the user is not gazing at the inside of the point region (NO in Operation S8), in processing in FIG. 16, the position being gazed by the user 7 is a position different from the inside of the point region and the inside of the operation region within the display screen 201. In this case, the information processing device 3 creates screen data in which the positions of the pointer region and the operation region are changed based on the current position being gazed by the user 7 (Operation S10). Processing in Operation S10 is performed by the region determination unit 341 and the screen data creation unit 343 of the operation processing unit 340. When processing in Operation S10 is performed, the information processing device 3 ends processing on the selected image.

As such, in a case where it is determined that a person is gazing at the display screen from the image, the information processing device 3 according to the second embodiment creates screen data including information indicating a point region including a point being gazed and an operation region adjacent to the point region, and causes the display device 2 to display the screen data. Furthermore, in a case where screen data including information indicating the point region and the operation region is displayed on the display device 2 and the user 7 is gazing at the inside of in the operation region, the information processing device 3 according to the second embodiment creates screen data including image information in the point region within the operation region. For that reason, in the operation of moving the pointer 810 in the point region BP by the line of sight input, the user 7 can confirm the position and the like of the pointer in the pointer region by using the image information in the pointer region displayed within the operation region being gazed. Accordingly, by displaying the screen data created by the information processing device 3 of the second embodiment on the display device 2, it is possible to reduce the movement amount of the line of sight for the purpose of confirming the position of the operation target (pointer) while gazing at the inside of the operation region and performing the line of sight input. The pointer movement operation can be performed without returning the line of sight to the point region BP and thus, for example, it is possible to restrain occurrence of unintended input operation (for example, backward movement of the pointer) by returning the line of sight to the point region BP. Therefore, according to the second embodiment, it is possible to improve operability of the input operation by the line of sight.

Furthermore, the information processing device 3 of the second embodiment can perform an operation different from the movement of the pointer by the line of sight input. For that reason, according to the second embodiment, operability of the input operation by the line of sight is further improved.

The information processing device 3 of the second embodiment may be a device (various electronic devices) integrated with the display device 2, the imaging device 4, the infrared light source 5, and the input device 10.

The information processing device 3 described above can be realized by a computer and a program executed by the computer.

Hereinafter, the information processing device 3 realized by a computer and a program will be described with reference to FIG. 16.

FIG. 16 is a diagram illustrating a hardware configuration of a computer. As illustrated in FIG. 16, a computer 20 includes a processor 2001, a main storage device 2002, an auxiliary storage device 2003, an input device 2004, an output device 2005, an input and output interface 2006, a communication control device 2007, a medium drive device 2008. These components 2001 to 2008 in the computer 20 are interconnected with each other via a bus 2010, and data can be exchanged between the components.

The processor 2001 is a central processing unit (CPU), a micro processing unit (MPU), or the like. The processor 2001 executes various programs including an operating system to control the overall operation of the computer 20. The processor 2001 executes, for example, a display program including each processing in FIG. 3 or each processing in FIG. 14 to generate a display screen using the line of sight input and the like.

The main storage device 2002 includes a read only memory (ROM) and a random access memory (RAM) (not illustrated). In the ROM of the main storage device 2002, for example, a predetermined basic control program and the like read by the processor 2001 at the time of activation of the computer 20 are recorded in advance. The RAM of the main storage device 2002 is used as a working storage area as demanded by the processor 2001 when various programs are executed. The RAM of the main storage device 2002 can be used for storing, for example, the line of sight history 391, the region information 392, and the like. The RAM of the main storage device 2002 can also be used for storing, for example, the display data 393, the correspondence list 394, and the like.

The auxiliary storage device 2003 is a storage device having a larger capacity than a hard disk drive (HDD) and the RAM of the main storage device 2002 such as and a nonvolatile memory (including a solid state drive (SSD)) such as a flash memory. The auxiliary storage device 2003 can be used for storing various programs and various pieces of data executed by the processor 2001. The auxiliary storage device 2003 can be used, for example, for storing a display program including each processing in FIG. 3 or each processing in FIG. 14. The auxiliary storage device 2003 can be used for storing, for example, the line of sight history 391, the region information 392, the display data 393, the correspondence list 394, and the like.

The input device 2004 is, for example, a keyboard device, a touch panel device, or the like. When an operator (user) of the computer 20 performs a predetermined operation on the input device 2004, the input device 2004 transmits input information associated with the operation content to the processor 2001. The input device 2004 can be used as the input device 10 described in the second embodiment.

The output device 2005 is, for example, a display device such as a liquid crystal display device or a voice reproducing device such as a speaker. The output device 2005 can be used, for example, as the display device 2 in the display system 1.

The input and output interface 2006 connects the computer 20 to another electronic device. The input and output interface 2006 includes, for example, a connector of the universal serial bus (USB) standard. The input and output interface 2006 can be used, for example, for connection between the computer 20 and the imaging device 4.

The communication control device 2007 is a device that connects the computer 20 to a network such as the Internet and controls various communications between the computer 20 and other electronic devices via the network. For example, the communication control device 2007 can be used for communication between the computer 20 and a server device that provides the display data 393.

The medium drive device 2008 reads out programs and data recorded in a portable recording medium 21 and writes data and the like stored in the auxiliary storage device 2003 into the portable recording medium 21. For the medium drive device 2008, for example, a memory card reader/writer compatible with one or more types of standards can be used. In a case where a memory card reader/writer is used as the medium drive device 2008, as the portable recording medium 21, a memory card (flash memory) or the like compliant with a standard with which a reader/writer for a memory card is compatible, for example, the secure digital (SD) standard, can be used. As the portable recording medium 21, for example, a flash memory having a USB standard connector can be used. Furthermore, in a case where the computer 20 is equipped with an optical disk drive usable as the medium drive device 2008, various types of optical disks recognizable by the optical disk drive can be used as the portable recording medium 21. Examples of optical disks that can be used as the portable recording medium 21 include a compact disc (CD), digital versatile disc (DVD), Blu-ray disc (Blu-ray is a registered trademark), and the like. The portable recording medium 21 can be used for storing, for example, the display program including each processing in of FIG. 3 or each processing in of FIG. 14. The portable recording medium 21 can be used for storing, for example, the line of sight history 391, the region information 392, the display data 393, the correspondence list 394, and the like.

When an operator inputs predetermined operation information to the computer 20 using the input device 2004 or the like, the processor 2001 reads the display program or the like stored in a non-transitory recording medium such as the auxiliary storage device 2003 and executes the display program or the like. While the display program is executed, the processor 2001 functions (operates) as the line-of-sight position calculation unit 320, the gaze determination unit 330, and the operation processing unit 340 in the information processing device 1. While the display program is executed, the RAM of the main storage device 2002, the auxiliary storage device 2003, and the like function as the storing unit 390 of the information processing device 3.

The computer 20 operated as the information processing device 3 may not include all the elements 2001 to 2008 illustrated in FIG. 16, and some components of the computer 20 can be omitted according to usage and conditions. For example, the communication control device 2007 and the medium drive device 2008 may be omitted in the computer 20.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable non-transitory recording medium storing a program that causes a computer to execute a procedure, the procedure comprising:
    calculating a position of a line of sight of a user in a display screen of a display device, based on information on an eyeball portion of the user included in an input image;
    setting, as a point region, a processing target region which is a target region of processing corresponding to an input operation by a line of sight;
    setting, respectively in the display device, as two or more operation regions, two or more regions that are adjacent to the processing target region, the two or more operation regions are for receiving the input operation by the line of sight based on the position of the line of sight and information on a field of view of the user; and
    when a line of sight is detected in one of the two or more operation regions:
        displaying, on the display device, the point region including image information contained within the point region;
        displaying, on the display device, the two or more operation regions adjacent to the point region, at least one of the two or more operation regions include the image information of the point region; and
        moving a pointer within the point region in accordance with a positional relationship between the point region and the operation region that includes the detected line of sight.

2. The computer-readable non-transitory recording medium according to claim 1,
    wherein in displaying the two or more operation regions, only the operation region that includes the detected line of sight is displayed to include the image information within the point region.

3. The computer-readable non-transitory recording medium according to claim 1, wherein displaying the point region further comprises:
    combining image information within the point region with image information in a region corresponding to one of the two or more operation regions before setting the two or more operation regions.

4. The computer-readable non-transitory recording medium according to claim 1,
    wherein the information on the field of view of the user includes information for indicating an effective field of view of the user, and
    wherein, in the setting the point region and the two or more operation regions, dimensions of the point region and the two or more operation regions are determined, based on the information for indicating the effective field of view.

5. The computer-readable non-transitory recording medium according to claim 4, the procedure further comprising:
    calculating a distance from the display screen to an eyeball of the user, based on an inter-pupil distance of the user included in the image and an imaging range of an imaging device that captures the image, and wherein, in the setting the point region and the two or more operation regions, the dimensions of the point region and the two or more operation regions are determined, based on information for indicating the effective field of view and the distance from the display screen to the eyeball of the user.

6. The computer-readable non-transitory recording medium according to claim 1,
wherein the input operation by the line of sight includes an operation of changing a positional relationship between a predetermined object displayed within the point region and another object.

7. An information processing device comprising:
a memory; and
a processor coupled to the memory and the processor configured to:
   calculate a position of a line of sight of a user in a display screen of a display device coupled to the information processing device, based on information on an eyeball portion of the user included in an input image;
   set, as a point region, a processing target region which is a target region of processing corresponding to an input operation by a line of sight;
   set, respectively in the display device, as two or more operation regions, two or more regions that are adjacent to the processing target region, the two or more operation regions are for receiving the input operation by the line of sight based on the position of the line of sight and information on a field of view of the user; and
   when a line of sight is detected in one of the two or more operation regions:
      display, on the display device, the point region including image information contained within the point region;
      display, on the display device, the two or more operation regions adjacent to the point region, at least one of the two or more operation regions include the image information of the point region; and
      move a pointer within the point region in accordance with a positional relationship between the point region and the operation region that includes the detected line of sight.

8. A display method of an information processing device, the display method comprising:
   calculating a position of a line of sight of a user in a display screen of a display device coupled to the information processing device, based on information on an eyeball portion of the user included in an input image;
   setting, as a point region, a processing target region which is a target region of processing corresponding to an input operation by a line of sight;
   setting, respectively in the display device, as two or more operation regions, two or more regions that are adjacent to the processing target region, the two or more operation regions are for receiving the input operation by the line of sight based on the position of the line of sight and information on a field of view of the user; and when a line of sight is detected in one of the two or more operation regions:
   displaying, on the display device, the point region including image information contained within the point region;
   displaying, on the display device, the two or more operation regions adjacent to the point region, at least one of the two or more operation regions include the image information of the point region; and
   moving a pointer within the point region in accordance with a positional relationship between the point region and the operation region that includes the detected line of sight.

\* \* \* \* \*